US012777004B2

(12) United States Patent
Bailey

(10) Patent No.: US 12,777,004 B2
(45) Date of Patent: Oct. 27, 2026

(54) DEVICE SENSOR INFORMATION AS CONTEXT FOR INTERACTIVE CHATBOT

(71) Applicant: GOOGLE LLC, Mountain View, CA (US)

(72) Inventor: Alexander Bailey, Wollerau (CH)

(73) Assignee: GOOGLE LLC, Mountain View, CA (US)

( * ) Notice: Subject to any disclaimer, the term of this patent is extended or adjusted under 35 U.S.C. 154(b) by 643 days.

(21) Appl. No.: 18/081,541

(22) Filed: Dec. 14, 2022

(65) Prior Publication Data

US 2024/0205174 A1 Jun. 20, 2024

(51) Int. Cl.
*G10L 13/00* (2006.01)
*G10L 13/033* (2013.01)
(Continued)

(52) U.S. Cl.
CPC .......... *H04L 51/02* (2013.01); *G10L 13/0335* (2013.01); *H04L 51/06* (2013.01)

(58) Field of Classification Search
CPC ..... H04L 51/02; H04L 51/06; G10L 13/0335; G06F 40/35; G06F 40/30; G06F 40/20; G06F 40/274; G06F 40/242; G06F 40/237; G06F 8/34; G06F 16/3329; G06F 3/0482; G06F 16/345; G06F 16/248; G06F 16/24522; G06F 16/334; G06F 16/3344; G06F 40/205; G06N 20/00; G06N 3/045;
(Continued)

(56) References Cited

U.S. PATENT DOCUMENTS 12,406,147 B2 * 9/2025 Baeuml .................... G06F 40/35
12,602,408 B2 * 4/2026 Baeuml ............... G06F 16/3322
(Continued)

FOREIGN PATENT DOCUMENTS

EP 3675121 A2 7/2020
WO 2015187584 A1 12/2015

OTHER PUBLICATIONS

Heckman et al. (Ting: A device to alert homeowners of scintillations which preclude electrical fires, Oct. 2018) (Year: 2018).*
(Continued)

*Primary Examiner* — Edgar X Guerra-Erazo
(74) *Attorney, Agent, or Firm* — Gray Ice Higdon

(57) ABSTRACT

Implementations relate to processing, utilizing a large language model ("LLM"), input that is based on sensor data, from sensor(s) of a client device, to generate LLM output—and causing output, that is based on the generated LLM output, to be rendered by an interactive chatbot. The input that is based on sensor data and that is processed by the LLM in generating the LLM output can be, or can include, non-acoustic input based on non-acoustic sensor data. For example, an instance of LLM output can be generated based on processing of non-acoustic input using the LLM and without any processing of acoustic input (that is based on acoustic sensor data) using the LLM. As another example, an instance of LLM output can be generated based on processing, using the LLM, both non-acoustic input that is based on non-acoustic data and acoustic input that is based on acoustic sensor data.

22 Claims, 9 Drawing Sheets

(51) Int. Cl.
*H04L 51/02* (2022.01)
*H04L 51/06* (2022.01)

(58) Field of Classification Search
CPC ...... G06N 3/0475; G06N 3/042; G06N 3/043; G06N 3/088; G06N 3/0895; G06N 3/09; G06N 3/091; G06N 3/092; G06N 3/094; G06N 3/096; G06N 3/098; G06N 20/20; G06N 5/04; G06N 5/042; G06N 5/045; G06N 5/048; G06N 7/023; G06N 7/02; G06N 7/026
See application file for complete search history.

(56) References Cited

U.S. PATENT DOCUMENTS

| | | | | |
|---|---|---|---|---|
| 2012/0022872 | A1 | 1/2012 | Gruber et al. | |
| 2018/0174020 | A1 | 6/2018 | Wu | |
| 2019/0220471 | A1 | 7/2019 | Mota Toledo et al. | |
| 2020/0382449 | A1* | 12/2020 | Taylor | G06F 16/3329 |
| 2023/0074406 | A1* | 3/2023 | Baeuml | G06F 16/90332 |
| 2023/0417439 | A1* | 12/2023 | Reichl | F24F 11/32 |
| 2024/0003950 | A1* | 1/2024 | Marshall | G01R 27/28 |
| 2024/0071598 | A1* | 2/2024 | Neumann | G16H 10/20 |
| 2024/0135619 | A1* | 4/2024 | Peshkov | H04L 51/02 |

OTHER PUBLICATIONS

Izzi, Adriano, et al. “LLM-Based Composition of Smart Data Services in Shop Floors.” (2022). (Year: 2022).*

Wei, Jason, et al. “Chain-of-thought prompting elicits reasoning in large language models.” Advances in neural information processing systems 35 (2022): 24824-24837. (Year: 2022).*

Robert, H., Sensor Fusion with Language Models; retrieved from the internet: URL:https://https://medium.com/@hhroberthdaniel/sensor-fusion-with-language-models-d6d512bcac2e; 12 pages; dated Jan. 1, 2021.

Jain, A. et al., “Linguistic Summarization of In-Home Sensor Data”; Journal of Biomedical Informatics, vol. 96; 11 pages; dated Aug. 1, 2019.

European Patent Office; International Search Report and Written Opinion issued in Application No. PCT/US2022/053208; 11 pages; dated Aug. 4, 2023.

Ghandeharioun et al., “EMMA: An Emotion-Aware Wellbeing Chatbot” arXiv:1812.11423v2 [cs.HC] 7 pages, dated Jul. 23, 2019.

* cited by examiner

DEVICE SENSOR INFORMATION AS CONTEXT FOR INTERACTIVE CHATBOT

BACKGROUND

Humans can engage in human-to-computer dialogs with interactive software applications referred to herein as "interactive chatbots" (also referred to as "interactive personal assistants," "intelligent personal assistants," "personal voice assistants," "conversational agents," etc.). An interactive chatbot can engage in a dynamic multi-turn interactive conversational session with a user. The interactive chatbot can initiate the session by greeting the user with one or more statements such as "Hello, how is your day today" and/or the session can be initiated by the user through an input (e.g., an initial question) directed to the interactive chatbot. Statements from the interactive chatbot can be rendered visually and/or audibly via a client device (e.g., smart phone) at which the interactive chatbot is installed and/or with which the interactive chatbot interfaces. Statements from the interactive chatbot are often pre-configured (e.g., initial greeting statements) or based solely on natural language input from the user (e.g., spoken or typed input).

Some interactive chatbots can optionally utilize a virtual character (also referred to as "virtual avatar", "interactive character", or "chatbot avatar", etc.) that visually represents the interactive chatbot. In such situations, the virtual character can be rendered as part of the interactive chatbot interface, and statements from the interactive chatbot can be rendered as emanating from the virtual character.

SUMMARY

Implementations described herein are directed to enhancing interactive conversations by enabling an interactive chatbot to utilize a large language model ("LLM") to process sensor data, and/or natural language content generated based on some of the sensor data, to generate LLM output. Those implementations utilize the generated LLM output to enable the interactive chatbot to provide rich and/or contextually relevant responses and/or artificial emotions. In these and other manners, such responses can enhance interactive conversations through the responses being easier to understand and/or otherwise resonating with the user, through the responses being contextually relevant and enabling conclusion of the interactive conversation more quickly, and/or through other means. The artificial emotions provided by an interactive chatbot can be, for example, expressed through facial expressions, voice, gestures, and/or movement of a virtual character that visually represents the interactive chatbot. The virtual character can be an animated avatar that is based on, for example, a real human, a fictional character, an animal, an animated object, and/or other visualized representations. Optionally, a plurality of virtual characters can each be configured to visually represent the interactive chatbot, and a user can select one of the plurality of virtual characters to be visually rendered at a graphical interface of the interactive chatbot at a given time.

In various implementations, the input that is based on sensor data and that is processed by the LLM in generating the LLM output can be, or can include, non-acoustic input based on non-acoustic sensor data. For example, an instance of LLM output can be generated based on processing of non-acoustic input using the LLM and without any processing of acoustic input (that is based on acoustic sensor data) using the LLM. Implementations that generate and utilize LLM output that is generated based on processing of non-acoustic input using the LLM and independent of any processing of acoustic input using the LLM enable the interactive chatbot to provide responsive output in response to various non-acoustic event(s). As another example, an instance of LLM output can be generated based on processing, using the LLM, both non-acoustic input that is based on non-acoustic data and acoustic input that is based on acoustic sensor data. For instance, the LLM output can be generated based on initially processing the non-acoustic input using the LLM to prime the LLM, then processing the acoustic sensor data using the LLM to generate the LLM output. Implementations that generate and utilize LLM output that is generated based on processing of both non-acoustic sensor data and acoustic sensor data using the LLM, enable the interactive chatbot to provide responsive output that is based on both the non-acoustic sensor data and the acoustic sensor data.

In some implementations, the non-acoustic sensor data is detected using one or more non-acoustic sensors of a client device at which the aforementioned interactive chatbot is installed and/or interfaces. As a non-limiting example, the non-acoustic sensor(s) can include an ambient light sensor, where the ambient light sensor can detect non-acoustic sensor data (here, ambient light data) indicating that a level of ambient light in the environment of the client device is approximately 30% (with 100% being the brightest and 0% being darkest). In this example, the non-acoustic sensor data can be processed as input ("raw non-acoustic sensor data input") by the LLM, to generate a corresponding LLM output. Based on the corresponding LLM output, a corresponding natural language statement (e.g., "It's getting dark, turn on the light?") can be generated and rendered via one or more conversational interfaces (graphic and/or audible interface) of the interactive chatbot, to initiate a new interactive conversation or to continue an existing interactive conversation.

Additionally or alternatively, some or all of the non-acoustic sensor data can be pre-processed to categorize an environment state (and/or a client device state) of the client device, and a natural language description that describes the categorized environment or client device state can be generated using the pre-processed non-acoustic sensor data. Continuing with the example above where "30%" is detected by the ambient light sensor indicating the level of ambient light, such non-acoustic sensor data ("ambient light: 30%") can be pre-processed (e.g., "categorized") to describe an environment state of the client device as being "dark". In this case, a natural language description (e.g., "ambient light: dark" or "it is dark right now") describing the categorized environment state of the client device can be generated as input (referred to herein as "natural language description input", "text-based sensor data input", or "text-based non-acoustic sensor data input") for the LLM. The LLM can process the natural language description (e.g., "ambient light: dark" or "it is dark right now") to generate a corresponding LLM output, based on which a natural language statement (e.g., "It's getting dark, turn on the light?") can be generated and rendered via the interactive chatbot.

As another non-limiting example, the non-acoustic sensor (s) can include an accelerometer, where the accelerometer detects raw non-acoustic data in a form of "Accelerometer: x=0.01 g, y=−9.0 g, z=0.04 g". Such non-acoustic sensor data can indicate a free-falling state of the client device (e.g., it is being dropped) and can be processed using the LLM to generate an LLM output. Alternatively or additionally, the accelerometer data ("Accelerometer: x=0.01 g, y=−9.0 g, z=0.04 g") can be pre-processed/categorized to describe a client device state of the client device as being "free-falling". Further, a natural language description, e.g., "accelerometer: freefall" or "device is falling", that describes the categorized client device state of the client device can be generated and that natural language description processed using the LLM to generate an LLM output. Based on the generated LLM output, a corresponding natural language statement (e.g., "Help! I'm falling, aaahhh!") can be generated and rendered via the interactive chatbot.

As a further non-limiting example, the non-acoustic sensor(s) can include an ambient light sensor and an accelerometer, where the ambient light sensor can detect ambient light data ("ambient light: 30%"), and where the accelerometer can detect accelerometer data ("Accelerometer: x=0.01 g, y=−9.0 g, z=0.04 g"). The LLM can be used to process both the raw ambient light data ("ambient light: 30%") and a natural language description of the accelerometer data (e.g., "accelerometer: freefall"), to generate LLM output. Alternatively, the LLM can be used to process both the raw ambient light data ("ambient light: 30%") and the raw accelerometer data ("Accelerometer: x=0.01 g, y=−9.0 g, z=0.04 g"), to generate LLM output. Alternatively, the LLM can be used to process both a natural language description of the ambient light data (e.g., "it is dark right now") and the raw accelerometer data ("Accelerometer: x=0.01 g, y=−9.0 g, z=0.04 g"), to generate LLM output. Alternatively, the LLM can be used to process both the natural language description of the ambient light data (e.g., "it is dark right now") and a natural language description of the accelerometer data (e.g., "accelerometer: freefall"), to generate LLM output. Put another way and more generally, for a non-acoustic sensor in a particular type, a particular type of input can be prepared/generated for processing by the LLM, where the particular type of input can be non-acoustic sensor data detected by the non-acoustic sensor in the particular type, and/or a natural language description generated based on the non-acoustic sensor data. For non-acoustic sensors in different types, different types of input can be generated for processing by the LLM.

In various implementations, after the LLM is used to process input that is generated based on the non-acoustic sensor data to generate the LLM output, the LLM output can be used to configure the virtual character (or other aspects of the interactive chatbot, e.g., a graphical interface of the interactive chatbot), instead of or in addition to being used to generate a natural language statement (e.g., "Help! I'm falling, aaahhh!"). In some implementations, a facial expression, an appearance, a background, a voice, a movement, and/or a gesture, of the virtual character, can be configured based on the LLM output. For instance, given an LLM output generated by processing a natural language description (e.g., "it is dark right now") using the LLM, a background of the virtual character (or a background of a graphical interface of the interactive chatbot) can be configured to show a starry sky, or a voice of the virtual character can be lowered or be fine-tuned from an excited voice to a calm or apprehensive voice. These examples are provided for the purpose of illustrations, and are not intended to be limiting.

Optionally, the one or more non-acoustic sensors of the client device can include an accelerometer, an orientation sensor, a pressure sensor, an ambient light sensor, a thermal sensor, a compass, a clock, a vision sensor, a motion sensor, a bump sensor, a wheel encoder, and/or any other appropriate non-acoustic sensor. Optionally, the client device can be a computer, a robot, a smart device, a vehicle, or other client device.

Optionally, the non-acoustic sensor data detected by the one or more non-acoustic sensors can be selectively transmitted to the LLM for processing by the LLM, or can be selectively pre-processed to generate the natural language description input for processing by the LLM. For example, during or outside of a conversational session between the interactive chatbot (accessible via the client device) and the user of the client device, when non-acoustic sensor data is received, only non-acoustic sensor data determined to satisfy one or more conditions is categorized in natural language and transmitted to the LLM, for processing by the LLM to generate an LLM output. The LLM output can be used to generate a statement or a response during an existing conversational session, or the LLM output can be used to initiate a new conversational session.

In various implementations, the one or more conditions can be based on a particular type of the non-acoustic sensor data (e.g., an ambient light sensor data vs. accelerometer data), and/or can be based on content of the non-acoustic sensor data. For instance, the one or more conditions can include a first condition requiring that the non-acoustic sensor data indicates a particular client device state of the client device, a second condition requiring that the non-acoustic data indicates a particular environment state of an environment of the client device, and/or a third condition requiring the non-acoustic sensor data to indicate that a duration of the client device being in a particular client device state or a particular environment state satisfies a duration threshold. For example, the non-acoustic sensor data can include accelerometer data, detected by an accelerometer of the client device, that indicates the client device is moving at a particular speed. If the particular speed satisfies a predetermined speed threshold (e.g., 10 mph) and the accelerometer data indicates that a duration during which the client device moves at the particular speed satisfies a predetermined duration threshold (e.g., 1 minute), the accelerometer data can be determined to satisfy the one or more conditions, and thus be pre-processed to generate a text-based sensor data input such as "driving". The text-based sensor data input of "driving" can be processed using the LLM to generate an LLM output in natural language, e.g., "Ooh, exciting! Where are we going?" This LLM output can be used by the interactive chatbot as an audio statement (e.g., the LLM output can indicate corresponding text, then the text is processed using a speech synthesizer to generate the audio statement) to initiate a conversation with a user, or to continue a conversation with the user audibly. Optionally or additionally, based on the LLM output, a voice of the interactive chatbot/virtual character can be configured to have an exciting tone and/or to have a raised voice volume. Optionally or additionally, based on the LLM output, the virtual character can be animated to be driving or sitting in a car.

Alternatively or additionally, the one or more conditions can be based on a category of the interactive chatbot or service(s) provided by the interactive chatbot. For instance, the one or more conditions can include a fourth condition requiring that the non-acoustic sensor data falls within one or more predetermined types of non-acoustic sensor data to which the interactive chatbot (or the virtual character that visually represents the interactive chatbot) is responsive to. As a non-limiting example, given an interactive chatbot configured to provide a service of exercise guidance, the fourth condition can require the non-acoustic sensor data be from a thermal sensor or humidity sensor, so that the interactive chatbot can provide exercise guidance based on the temperature and humidity of a surrounding environment.

Alternatively or additionally, the one or more conditions can be, or can include, a fifth condition requiring that the non-acoustic sensor data captures user input such as user gesture.

In various implementations, the interactive chatbot can receive acoustic sensor data (may also be referred to as "audio data") capturing a spoken utterance of the user from an acoustic sensor (e.g., one or more microphones). In some implementations, when the interactive chatbot receives the acoustic sensor data, along with the aforementioned non-acoustic sensor data, the interactive chatbot can utilize the LLM to process an input that is based on both the non-acoustic sensor data and the acoustic sensor data capturing the spoken utterance, to generate an LLM output. In some of those implementations, a non-acoustic portion of the input that is based on the non-acoustic sensor data can be processed initially using the LLM to prime the LLM, the acoustic portion of the input that is based on the acoustic sensor data can then be processed using the LLM, and the LLM output generated after processing the acoustic portion can be used as the LLM output for controlling the interactive chatbot. For example, the LLM output can be used to generate, for example textual content and/or avatar emotion (s) for rendering responsive to the spoken utterance. For example, the input can include recognized text from automatic speech recognition ("ASR") performed on the acoustic sensor data and can include a natural language description of the non-acoustic sensor data. Optionally, the input can further include the non-acoustic sensor data in addition to or instead of the natural language description thereof and/or can include the acoustic sensor data in addition to or instead of the recognized text based on performing ASR on the acoustic sensor data.

In some other implementations, the interactive chatbot may not receive the acoustic sensor data along with the non-acoustic sensor data. In some of those implementations, when the acoustic sensor data is received within a predetermined period of time subsequent to the non-acoustic sensor data, the interactive chatbot can still utilize the LLM to process, an input that is based on the non-acoustic sensor data and the acoustic sensor data capturing the spoken utterance, to generate an LLM output. Such LLM output can be used, for example, to generate textual content responsive to the spoken utterance.

Based on the generated textual content, a synthesized speech can be generated and rendered via the client device audibly, as a response to the spoken utterance. Alternatively or additionally, the generated textual content can be rendered via the client device visually. Additionally or additionally, based on the generated LLM output, a facial expression, an appearance, a background, a voice, a movement, and/or a gesture, of the virtual character (or other aspects of the interactive chatbot), can be controlled for presentation to the user, in response to the acoustic sensor data capturing the spoken utterance and the non-acoustic sensor data. Optionally, before being rendered to the user, the generated textual content can be modified based on a type of the interactive chatbot (or virtual character) and/or services (or functions) provided by the interactive chatbot, where the modified textual content is rendered to the user as a response to the spoken utterance.

As one particular example of generating LLM output based on both acoustic sensor data and non-acoustic sensor data, assume that a user provides a spoken utterance of "any ideas for brightening things up around here" that is captured in audio data. Further assume that ASR is performed on the audio data to generate acoustic input that is recognized text of "any ideas for brightening things up around here". Yet further, assume that the non-acoustic sensor data is ambient light sensor data, and non-acoustic input is generated that is a natural language description of the ambient light sensor data.

In a first situation, where it is dark and the ambient light sensor data indicates little to no ambient light, the non-acoustic input can be, for example, "it is dark". In the first situation, "it is dark" can be processed using the LLM initially to prime the LLM, then "any ideas for brightening things up around here" processed using the LLM to generate first LLM output. The first LLM output can be used to generate a statement of "how about turning on some lights", and that statement rendered as output of the interactive chatbot responsive to the spoken utterance.

In a second situation, where it is light and the ambient light sensor data indicates a high degree of ambient light, the non-acoustic input can be, for example, "it is bright". In the second situation, "it is light" can be processed using the LLM initially to prime the LLM, then "any ideas for brightening things up around here" processed using the LLM to generate second LLM output. The second LLM output will vary from the first LLM output based on being primed using different non-acoustic input. As a result, the second LLM output can be used to generate a very distinct statement, such as "how about a floral arrangement or some colorful pillows", and that statement rendered as output of the interactive chatbot responsive to the spoken utterance.

Accordingly, the LLM output that is generated based on processing, using an LLM, of recognized text of a given spoken utterance can vary in dependence on the non-acoustic input that is processed using the LLM and along with the recognized text (e.g., that is processed using the LLM before processing of the recognized text). In these and other manners, the LLM output can be tailored to not only the given spoken utterance, but also to non-acoustic sensor data that reflects a device state and/or environmental state. Accordingly, the interactive chatbot output that is provided based on the LLM output can more fully resonate with a user that provided the given spoken utterance and/or can obviate the need for additional dialog turn(s) with the interactive chatbot to resolve need(s) of the user.

In some implementations, the interactive chatbot can receive acoustic sensor data not capturing a spoken utterance of the user. For instance, the interactive chatbot can receive, from an acoustic sensor, audio data that captures a siren, dog bark, sound of raining or thundering, etc., and that does not capture any spoken utterance of the user. In some of those implementations, the interactive chatbot can similarly use the LLM to process the acoustic sensor data that does not capture any spoken utterance. Alternatively or additionally, a natural language description describing such acoustic sensor data, which captures no spoken utterance, can be generated as input for processing by the LLM. The acoustic sensor data not capturing any spoken utterance and/or the natural language description can be processed by the LLM to generate an LLM output. Based on the LLM output and responsive to the acoustic sensor data not capturing any spoken utterance, textual content can be generated and rendered to the user. Alternatively or additionally, based on the LLM output and responsive to the acoustic sensor data not capturing any spoken utterance, a facial expression, an appearance, a background, a voice, a movement, and/or a gesture, of the virtual character (or other aspects of the interactive chatbot), can be controlled for presentation to the user.

In some implementations, any of the aforementioned LLM outputs can include one or more probability distributions. For instance, an LLM output may include a corresponding probability distribution over a sequence of one or more words and/or phrases across one or more vocabularies, and the aforementioned textual content can be generated by selecting from the one or more words and/or phrases based on probabilities included in the probability distribution. In some implementations, the one or more vocabularies may include a vocabulary that is specific to a type of the interactive chatbot, or the virtual character. In additional or alternative implementations, the one or more vocabularies may include a general vocabulary, but selection of the textual content for inclusion in the textual content may be biased towards one or more words and/or phrases that are specific to the virtual character.

In some implementations, any of the aforementioned LLM outputs may additionally or alternatively include one or more visual cues for controlling one or more visual aspects (e.g., gesture, appearance, motions, etc.) of the virtual character, or for controlling other aspects of a graphical interface of the interactive chatbot. In determining the one or more visual cues as described herein, an LLM output may include a corresponding probability distribution over a sequence of tokens representing one or more animated physical motion gestures that are performable by the virtual character. The visual cues can be selected from the one or more animated physical motion gestures based on probabilities included in the probability distribution and for the sequence of tokens. In some implementations, the one or more animated physical motion gestures may include animated physical motion gestures that are specific to the virtual character. In additional or alternative implementations, the one or more animated physical motion gestures may include general animated physical motion gestures, but selection of the animated physical motion gestures for inclusion in the one or more visual cues may be biased towards one or more animated physical motion gestures that are specific to the virtual character.

In some implementations, the interactive chatbot can receive acoustic sensor data capturing a spoken utterance of the user, and process the acoustic sensor data using an automatic speech recognition (ASR) model to generate an ASR output which recognizes the spoken utterance in natural language. Such generated ASR output can be processed, using a natural language understanding (NLU) model, to generate a NLU output, based on which an interactive chatbot output that is responsive to the spoken utterance can be generated and rendered (audibly and/or visually) to the user. Optionally, the interactive chatbot output can be applied to control a facial expression, an appearance, a background, a voice, a movement, and/or a gesture, of the virtual character (or other visual or audible aspects of the interactive chatbot). Optionally, before being rendered to the user, the interactive chatbot output can be modified based on a type of the interactive chatbot (or virtual character) and/or services (or functions) provided by the interactive chatbot, where the modified interactive chatbot output is rendered to the user as a response to the spoken utterance.

Alternatively or additionally, in some implementations, the acoustic sensor data capturing a spoken utterance, along with the ASR output, the NLU output, and/or a context of a dialog session ("interactive conversation"), can be processed using the LLM, to generate the interactive chatbot output. In these implementations, the generated interactive chatbot output may not need to be modified since it may be generated specific to the virtual character through utilization of the LLM. For instance, an instance of the LLM may have been previously trained to generate interactive chatbot outputs for a given virtual character. In this instance, each of the plurality of virtual characters may be associated with a corresponding instance of the LLM. Also, for instance, the LLM may be general to the plurality of virtual characters selectable to visually represent the interactive chatbot, but the LLM may additionally process given virtual character data that is specific to the given virtual character to tailor the interactive chatbot output, generated using the LLM.

By using the techniques described herein, one or more technical advantages can be achieved. As one non-limiting example, the techniques described herein enable the interactive chatbot to not only provide more robust and contextually relevant content to initiate or continue a dialog session with the user, but also control a display and/or a voice of the virtual character that visually represents the interactive chatbot. As a result, dialog sessions between the user and the interactive chatbot may better resonate with the user through utilization of the LLMs described herein. As a result, a quantity of instances that the user repeats a spoken utterance and/or a quantity of instances that the dialog sessions fails may be reduced, thereby reducing a quantity of computational and/or network resources consumed in the user repeating the spoken utterance and/or the dialog session failing.

As used herein, a "dialog session" may include a logically-self-contained exchange between a user and the interactive chatbot (and in some cases, other human participants). The interactive chatbot may differentiate between multiple dialog sessions with the user based on various signals, such as passage of time between sessions, change of user context (e.g., location, before/during/after a scheduled meeting, etc.) between sessions, detection of one or more intervening interactions between the user and the client device other than dialog between the user and the interactive chatbot (e.g., the user switches applications for a while, the user walks away from then later returns to a voice-activated interactive chatbot), locking/sleeping of the client device between sessions, change of client devices used to interface with the interactive chatbot, and so forth. Notably, during a given dialog session, a user can interact with the interactive chatbot using various input modalities, including, but not limited to, spoken input, typed input, and/or touch input.

The above description is provided as an overview of only some implementations disclosed herein for the sake of example. Those implementations, and other implementations, are described in additional detail herein.

It should be understood that techniques disclosed herein can be implemented locally on a client device, remotely by server(s) connected to the client device via one or more networks, and/or both.

DETAILED DESCRIPTION

Figure 1A:
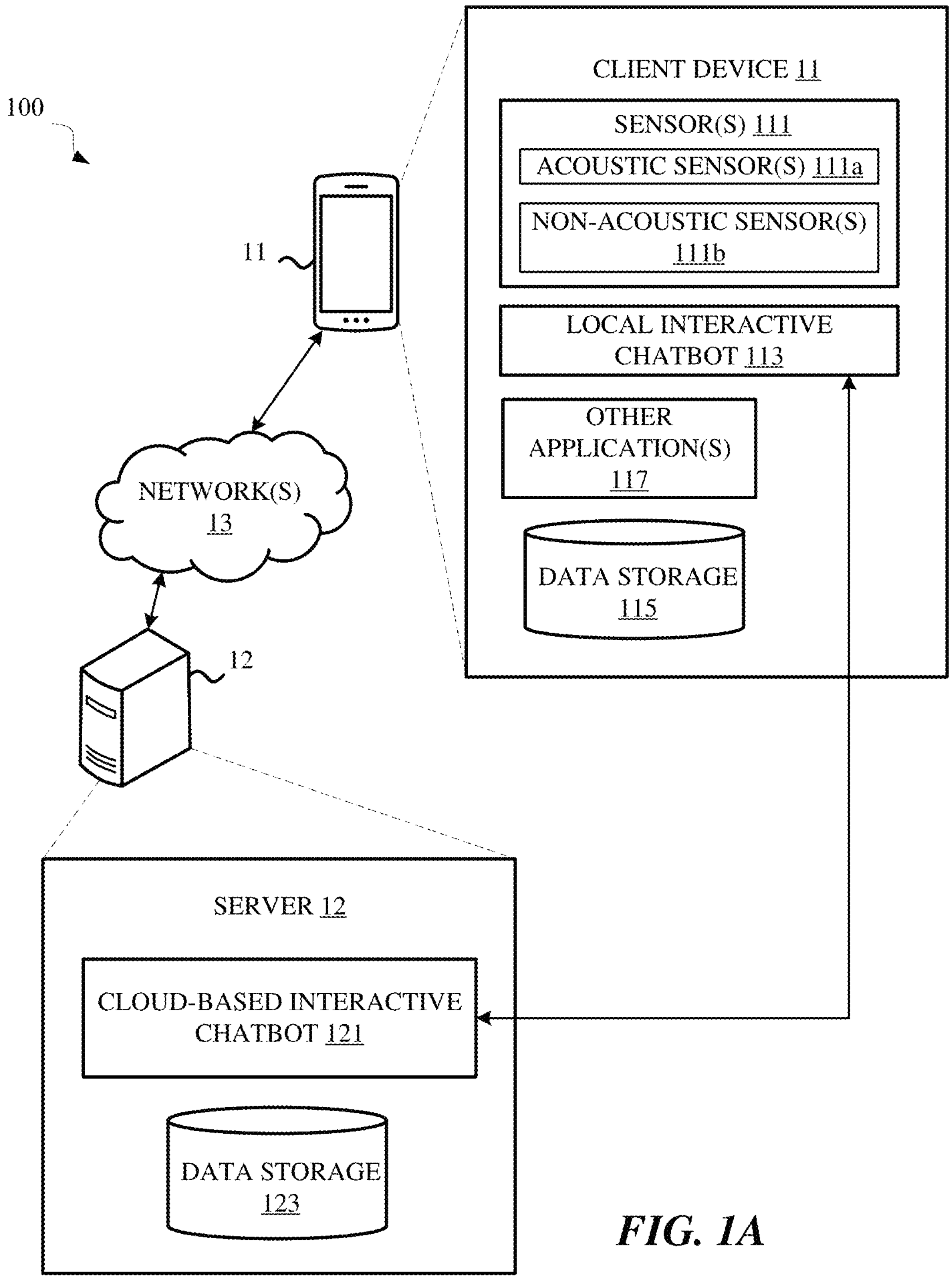
FIG. 1A depicts a block diagram of an example environment that demonstrates various aspects of the present disclosure, and in which implementations disclosed herein can be implemented.

FIG. 1A provides a block diagram of an example environment 100 that demonstrates various aspects of the present disclosure, in which implementations disclosed herein can be implemented. The example environment 100 includes a client computing device ("client device") 11, and a server computing device 12 (may also be referred to as "server") in communication with the client device 11 via one or more networks 13. The client device 11 can be, for example, a cell phone, an interactive speaker, a computer (e.g., laptop, desktop, notebook), a tablet, a robot, a smart appliance (e.g., smart TV), a messaging device, an in-vehicle device (e.g., in-vehicle navigation system or in-vehicle entertainment system), a wearable device (e.g., watch or glasses), a virtual reality (VR) device, an augmented reality (AV) device, or a personal digital assistant (PDA), and the present disclosure is not limited thereto. The one or more networks 13 can include, for example, one or more wired or wireless local area networks ("LANs," including Wi-Fi LANs, mesh networks, Bluetooth, near-field communication, etc.) or wide area networks ("WANs", including the Internet).

In various implementations, the client device 11 can include one or more sensors 111, and a local interactive chatbot 113, where the local interactive chatbot 113 is in communication with a cloud-based interactive chatbot 121 at the server computing device 12. The client device 11 can include a data storage 115 storing user data (e.g., account data, user preference data, user historical data), device data (e.g., sensor data), and application data (e.g., chat history of the local interactive chatbot 113), etc. The client device 11 can optionally be installed with other application(s) 117 other than the local interactive chatbot 113.

The local interactive chatbot 113 and the cloud-based interactive chatbot 121 can be collectively referred to as "interactive chatbot", and the interactive chatbot here can be visually represented by a virtual character, which can be an animated avatar based on, for example, a real human, a fictional character, an animal, an animated object, and/or other visualized representations. It's noted that a plurality of virtual characters can be configured to visually represent the interactive chatbot, and a user can select one of the plurality of virtual characters to be visually rendered at a graphical interface of the interactive chatbot.

The one or more sensors 111 can include: one or more acoustic sensors 111*a* (e.g., sound-detection sensors for microphone(s)), and/or one or more non-acoustic sensors 111*b*. The one or more non-acoustic sensors 111*b* can include: one or more touch sensors for a touch display or keyboard, one or more vision sensors for camera(s), one or more accelerometers, one or more orientation sensors, one or more pressure sensors, one or more bump sensors, a light sensor (e.g., ambient light sensor), a temperature sensor, a compass sensor, a clock, a location sensor, a barometer, a humidity sensor, a pedometer, a proximity sensor, and/or any other sensors when appropriate (e.g., wheel encoders for a robot).

Here, the sensor data, be it non-acoustic or acoustic, can indicate a state of the client device and/or an environment of the client device. As a non-limiting example, the ambient light sensor of the client device 11 can detect non-acoustic sensor data (here, ambient light data) indicating that a level of ambient light in the environment of the client device is approximately 30% (with 100% being the brightest and 0% being darkest). In this example, such ambient light data (e.g., a level of ambient light being approximately 30%) can indicate an environment state of the client device as being "dark". As another non-limiting example, an accelerometer of the client device 11 can detect non-acoustic data (e.g., accelerometer data) in a form of "x=0.01 g, y=−9.0 g, z=0.04 g", and such accelerometer data ("x=0.01 g, y=−9.0 g, z=0.04 g") can indicate a client device state of the client device as being "freefalling".

Figure 1B:
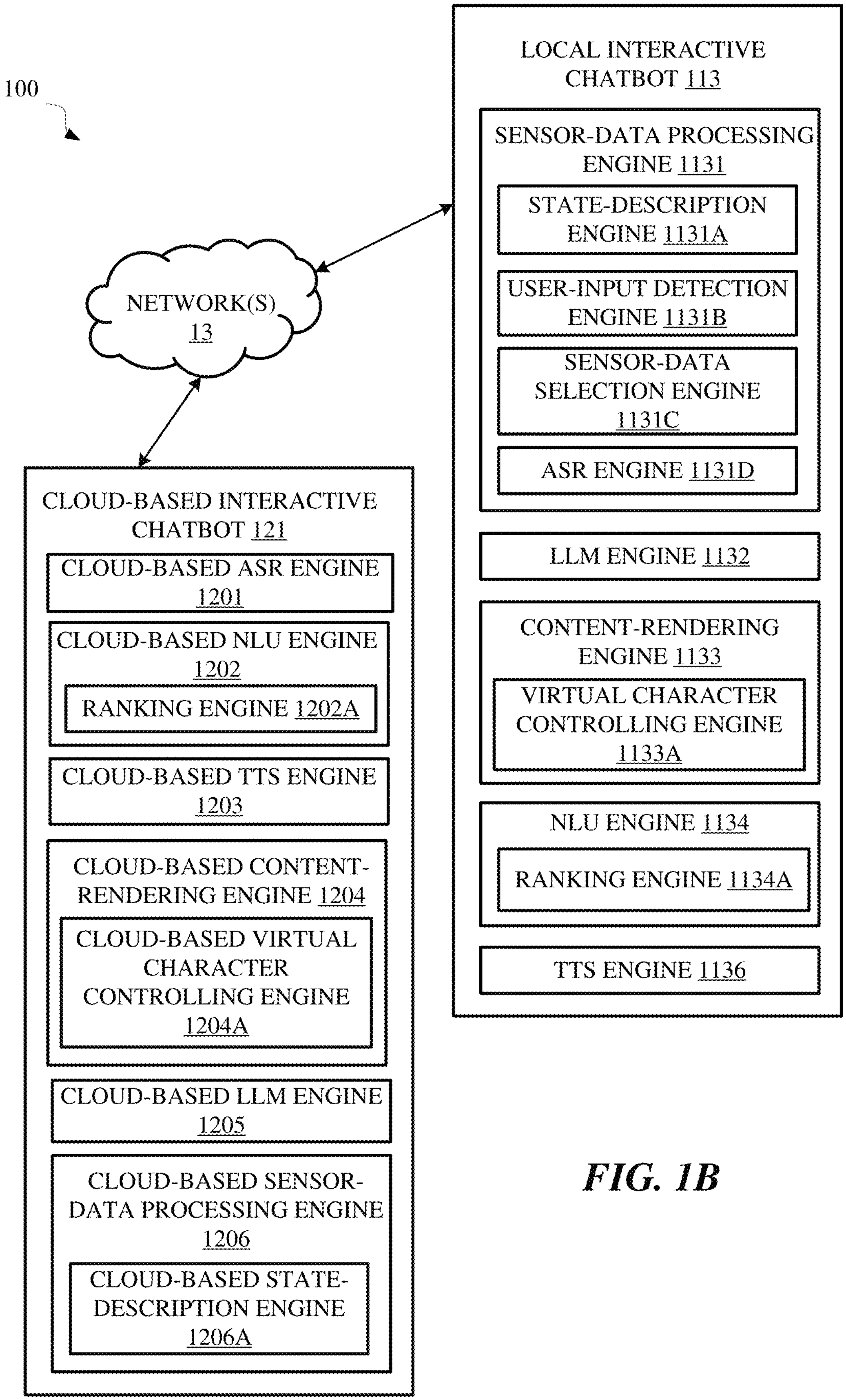
FIG. 1B depicts a block diagram of one or more components in FIG. 1A, in which implementations disclosed herein can be implemented.

In various implementations, referring to FIG. 1B, the local interactive chatbot 113 (or the client device 11) can include a sensor-data processing engine 1131, a large language model (LLM) engine 1132 that accesses a trained large language model (LLM, not shown in FIG. 1B), and/or a content-rendering engine 1133, where the content-rendering engine 1133 can include a virtual character controlling engine 1133A to control a virtual character that visually represents the interactive chatbot 113 The trained LLM can be or include one or more transformer models, such as Meena, RNNs, and/or any other applicable LLM. In various implementations, the sensor-data processing engine 1131 can include a state-description engine 1131A that generates a natural language description that describes an environment state (or a client device state) of the client device 11, using sensor data captured by one or more of the non-acoustic sensors 111*b*.

As mentioned previously, in a non-limiting example, an ambient light sensor of the client device 11 can detect, at a certain point of time, that a level of ambient light in an environment of the client device 11 is approximately 30%. In this example, the state-description engine 1131A can generate, based on raw sensor data (i.e., "30%"), a natural language description, such as "it's dark right now" or "a level of ambient light indicates that it's dark now", that describes an environment state of an environment of the client device 11. As mentioned previously, in another non-limiting example, an accelerometer of the client device 11 can detect that, at a certain point of time, a respective change in velocity of the client device 11 along each of the three axes (i.e., x-axis, y-axis, z-axis) of the Cartesian coordinate system is: "x=0.01 g, y=−9.0 g, z=0.04 g". In this example, the state-description engine 1131A can generate, based on processing raw sensor data (i.e., "x=0.01 g, y=−9.0 g, z=0.04 g"), a natural language description, such as "device is falling", that describes a client device state of the client device 11. The natural language description (i.e., generated by the state-description engine 1131A based on processing the sensor data) can be transmitted to the LLM engine 1132, for processing by the LLM engine 1132 using the trained LLM.

Optionally, it's noted that the state-description engine 1131A can selectively process sensor data captured by one or more of the non-acoustic sensors 111*b*, to generate a natural language description that describes an environment state, or a client device state, of the client device 11. For instance, the state-description engine 1131A can process ambient light data to generate a corresponding natural language description as input for a trained LLM, while not processing any accelerometer data, so that instead of a corresponding natural language description for the accelerometer data, the accelerometer data (when applicable) is processed using the trained LLM as input. Optionally, the interactive chatbot 113 can be configured with one or more sensor data processing rules defining the way the state-description engine 1131A selectively processes sensor data.

In some implementations, the sensor-data processing engine 1131 can further include a user-input detection engine 1131B that is configured to determine whether user input is received from one or more of the non-acoustic sensors 111*b*. For example, the one or more vision sensors of the client device 11 can receive vision data that capture images, videos, and/or certain motions (e.g., gestures) in a field of view of the one or more vision sensors. In this example, the user-input determination engine 11312 can determine that user input is received when a gesture from a user is detected from the vision data received via the one or more vision sensors. As another example, the one or more force-detecting sensors of the client device 11 can receive an external force from a user of the client device 11. In this example, the user-input detection engine 1131B can determine that user input is received if the one or more force-detecting sensors detect one or more particular types of user touch, such as ergonomic finger movements, squeezes, etc.

In some implementations, the sensor-data processing engine 1131 can further include a sensor-data selection engine 1131C that selects or filter sensor data based on one or more conditions, where the sensor-data selection engine 1131C transmits only the sensor data that satisfies the one or more conditions to the LLM engine 1132, for processing by the LLM engine 1132 using the trained LLM. Alternatively or additionally, the sensor-data selection engine 1131C transmits only the sensor data that satisfies the one or more conditions to the state-description engine 1131A, so that the state-description engine 1131A can generate a corresponding natural language description that describes an environment state, or a client device state, of the client device 11, to be applied as input to the trained LLM.

The one or more conditions can be based on a particular type of the non-acoustic sensor data (e.g., an ambient light sensor data vs. accelerometer data), and/or can be based on content of the non-acoustic sensor data. For instance, the one or more conditions can include a first condition requiring that the non-acoustic sensor data indicates a particular client device state of the client device, a second condition requiring that the non-acoustic data indicates a particular environment state of an environment of the client device, and/or a third condition requiring the non-acoustic sensor data to indicate a duration of the client device in a particular client device state or a particular environment state satisfies a duration threshold.

As a non-limiting example, the non-acoustic sensor data can include accelerometer data, detected by an accelerometer of the client device, that indicates the client device is moving at a particular speed. If the particular speed satisfies a predetermined speed threshold (e.g., 10 mph) and the accelerometer data indicates that a duration during which the client device moves at the particular speed satisfies a predetermined duration threshold (e.g., 1 min), the accelerometer data can be determined to satisfy the one or more conditions, and thus be pre-processed using the state-description engine 1131A to generate a text-based sensor data input such as "driving", for processing by the LLM engine 1132.

Alternatively or additionally, the one or more conditions can be based on a category of the interactive chatbot or service(s) provided by the interactive chatbot. For instance, the one or more conditions can include a fourth condition requiring that the non-acoustic sensor data falling within one or more predetermined types of non-acoustic sensor data to which the interactive chatbot (or the virtual character that visually represents the interactive chatbot) is responsive to. As a non-limiting example, given an interactive chatbot configured to provide a service of exercise guidance, the fourth condition can require the non-acoustic sensor data being from one of the following list of non-acoustic sensors: thermal sensor and humidity sensor, so that the interactive chatbot can provide exercise guidance based on the temperature and humidity of a surrounding environment.

Alternatively or additionally, the one or more conditions can be, or can include, a fifth condition requiring that the non-acoustic sensor data captures user input such as user gesture or squeeze, determined as user input by the aforementioned user-input detection engine 1131B.

The LLM engine 1132 can access the trained LLM, and utilize the trained LLM to process the non-acoustic sensor data (raw, selected, or which is pre-processed into a natural language description) as input, to generate a corresponding LLM output. For instance, the LLM engine 1132 can process a natural language description (e.g., "we are moving very fast") generated based on non-acoustic sensor data (e.g., a speed of approximately 40 mph, detected using an accelerometer of the client device 11), to generate an LLM output in natural language, such as, "Ooh, exciting! Where are we going?" In this case, the LLM output (here, "Ooh, exciting! Where are we going?") can be processed by a speech synthesizer (e.g., a text-to-speech engine) into a corresponding synthesized speech, to be rendered via an audible interface of the client device 11. In some implementations, when such corresponding synthesized speech is audibly rendered via the local interactive chatbot 113, the corresponding synthesized speech can initiate a new conversation between the local interactive chatbot 113 and a user of the client device 11, or can continue an existing conversation between the local interactive chatbot 113 and the user. The corresponding synthesized speech or other audible content, for instance, can be rendered using one or more speakers of the client device 11.

Continuing with the example above, in cases where a virtual character visually represents the local interactive chatbot 113 is displayed at a graphical interface of the local interactive chatbot 113, the virtual character controlling engine 1133A can, based on the LLM output ("Ooh, exciting! Where are we going?"), control the virtual character to have an exciting voice and/or to raise the voice volume of the virtual character. Alternatively or additionally, based on the LLM output in natural language ("Ooh, exciting! Where are we going?"), the virtual character controlling engine 1133A can control the virtual character by displaying an animation of the virtual character driving or sitting in a car. Alternatively or additionally, based on the LLM output in natural language ("Ooh, exciting! Where are we going?"), the virtual character controlling engine 1133A can control the virtual character to have a facial expression or gesture indicating excitement. That is, the virtual character controlling engine 1133A can, based on the LLM output, control a facial expression, voice, gesture, background, appearance, and/or movement of the virtual character.

It's noted that, in some implementations, other aspects of the interactive chatbot, e.g., a graphical interface of the interactive chatbot, may also be controlled based on the LLM output, in addition to or instead of controlling the virtual character. For instance, given an LLM output generated by processing a natural language description (i.e., "it is dark right now") using the LLM, a background of a graphical interface of the interactive chatbot (or a background of the virtual character) can be configured to show a starry sky, or a voice of the virtual character can be lowered or be changed from an excited voice to a calm or apprehensive voice. The virtual character, or other visual content can be rendered to the user, for instance, using a display or projector of the client device 11.

The control of the facial expression, voice, gesture, background, appearance, and/or movement of the virtual character may allow the interactive chatbot to express artificial emotions through one or more facial expressions, tone or volume of a voice, gestures, and/or movement, of the virtual character, that are emotion-relevant.

In various implementations, the local interactive chatbot 113 can further include an automatic speech recognition (ASR) engine 1131D, where the ASR engine 1131D can be (but does not necessarily need to be) included in the sensor-data processing engine 1131. In various implementations, the local interactive chatbot 113 can further include a natural language understanding (NLU) engine 1134, and a text-to-speech (TTS) engine 1136.

The ASR engine 1131D can process audio data provided to the local interactive chatbot 113 that captures a spoken utterance of a user, to generate a textual representation of the spoken utterance. For example, the ASR engine 1131D can process the audio data, utilizing one or more ASR models, to generate a recognized text of the spoken utterance. In this example, the ASR engine 1131D can generate, for each of one or more recognized terms in the recognized text, a corresponding confidence measure that indicates confidence that a recognized term corresponds to the spoken utterance. The one or more ASR models can be any ML model (e.g., a recurrent neural network (RNN) model, or a transformer model) that is capable of performing speech recognition.

The (NLU) engine 1134 can interpret the spoken utterance (e.g., "could you provide some latest music?") provided to the local interactive chatbot 113, to derive an intent (e.g., "play music" being the intent) of the user or a desired action by the user, as well as other relevant information. As a non-limiting example, the (NLU) engine 1134 can perform, using one or more NLU models and/or one or more grammar-based rules, natural language understanding on the textual representation (e.g., "where is Kentucky Derby for the year 2023") recognized from the spoken utterance generated by the ASR engine 1131D, to generate a NLU output, i.e., one or more NLU hypotheses. As a non-limiting example, the NLU output can include a search query that requests the return of one or more search results for a location at which the Kentucky Derby will be held in 2023. In this example, a search result for a location where the Kentucky Derby is held in 2023 can be rendered by the content-rendering engine 1133 via a display of the client device 11. Alternatively or additionally, continuing with this example, the search result for a location where Kentucky Derby is held in 2023 can be processed using the TTS engine 1136 into a corresponding synthesized speech, to be rendered audibly via the client device 11.

Optionally, the aforementioned one or more NLU models can be a long short-term memory (LSTM), a gated recurrent unit (GRU), or any other type of ML models capable of performing NLU. It's noted that the (NLU) engine 1134 may process any suitable textual representation, regardless of whether the textual representation is generated by the ASR engine 1131D or received via a keyboard, touch screen, or a search engine. Optionally, the (NLU) engine 1134 can include a ranking engine 1134A that ranks, based on user preference/historical data, the one or more hypotheses generated as NLU output by the (NLU) engine 1134. Optionally, the ranking engine 1134A can be separate from the (NLU) engine 1134.

In various implementations, the TTS engine 1136 can generate a computer-generated synthetic speech based on the aforementioned LLM output, the NLU output, or other textual content formulated by the local interactive chatbot 113.

It's appreciated that, alternatively, or in addition to using the LLM engine 1132 to process the aforementioned non-acoustic sensor data (or a natural language description generated based on the aforementioned non-acoustic sensor data) using the LLM, the LLM engine 1132 can process the aforementioned ASR output (e.g., a speech recognition of user utterance(s)) and/or any of the aforementioned non-acoustic sensor data, to generate an LLM output. Alternatively or additionally, in some implementations, the LLM engine 1132 can process, using the LLM, the aforementioned ASR output and the natural language description generated based on the aforementioned non-acoustic sensor data, to generate an LLM output. Such generated LLM output can be applied to formulate a natural language statement to be audibly rendered via the local interactive chatbot 113, and/or can be applied to control a virtual character, of the local interactive chatbot 113, that is visually rendered to a user that interacts with the local interactive chatbot 113.

In various implementations, referring again to FIG. 1B, the cloud-based interactive chatbot 121 can include a cloud-based ASR engine 1201, a cloud-based NLU engine 1202, a cloud-based TTS engine 1203, a cloud-based content-rendering engine 1204, a cloud-based LLM engine 1205. The cloud-based content-rendering engine 1204 can include a cloud-based virtual character controlling engine 1204A. Optionally, the cloud-based interactive chatbot 121 can further include a cloud-based sensor-data processing engine 1206, including a cloud-based state-description engine 1206A and/or a cloud-based user-input detection engine (not shown in FIG. 1B). Descriptions for these cloud-based components of the cloud-based interactive chatbot 121 can be found in their counterparts in the local interactive chatbot 113, and repeated descriptions are omitted herein. However, it's appreciated that these cloud-based components of the cloud-based interactive chatbot 121 can be trained more extensively or possess a stronger computing capability than their counterparts in the local interactive chatbot 113, due to their access to a greater amount of computing resources.

In various implementations, the client device 11 and/or the server computing device 12 can include one or more memories (see e.g., data storage 123 in FIG. 1A) for storage of data and/or software applications, one or more processors for accessing data and executing the software applications, and/or other components that facilitate communication over one or more of the networks 13. In some implementations, one or more of the software applications can be installed locally at the client device 11, whereas in other implementations one or more of the software applications can be hosted remotely (e.g., by one or more servers) and can be accessible by the client device 11 over one or more of the networks 13.

In some implementations, the local interactive chatbot 113 can receive acoustic sensor data not capturing a spoken utterance of the user. For instance, the local interactive chatbot 113 can receive a noise, siren, dog bark, sound of raining or thundering, etc., from an acoustic sensor as acoustic sensor data that does not capture a spoken utterance of the user. In these implementations, the local interactive chatbot 113 or the cloud-based interactive chatbot 121 can similarly use a trained LLM to process the acoustic sensor data not capturing any spoken utterance, as input, to generate an LLM output. Alternatively or additionally, a natural language description describing such acoustic sensor data which captures no spoken utterance can be generated as input, for processing by the trained LLM, to generate an LLM output. Based on the LLM output and responsive to the acoustic sensor data not capturing any spoken utterance, textual content can be generated by the interactive chatbot, and be rendered to the user. Alternatively or additionally, based on the LLM output and responsive to the acoustic sensor data not capturing any spoken utterance, a facial expression, an appearance, a background, a voice, a movement, and/or a gesture, of a virtual character (or other aspects of the interactive chatbot) of the interactive chatbot, can be controlled for presentation to the user.

In some implementations, any of the aforementioned LLM output may include one or more probability distributions. For instance, an LLM output may include a corresponding probability distribution over a sequence of one or more words and/or phrases across one or more vocabularies, and the aforementioned textual content can be generated by selecting from the one or more words and/or phrases based on probabilities included in the probability distribution. In some implementations, the one or more vocabularies may include a vocabulary that is specific to a type of the interactive chatbot, or the virtual character. In additional or alternative implementations, the one or more vocabularies may include a general vocabulary, but selection of the textual content for inclusion in the textual content may be biased towards one or more words and/or phrases that are specific to the virtual character.

In some implementations, optionally, any of the aforementioned LLM output may include one or more visual cues for controlling one or more visual aspects (e.g., gesture, appearance, motions, etc.) of the virtual character, or for controlling other aspects of a graphical interface of the interactive chatbot. In determining the one or more visual cues as described herein, an LLM output may include a corresponding probability distribution over a sequence of tokens representing one or more animated physical motion gestures that are performable by the virtual character. The visual cues can be selected from the one or more animated physical motion gestures based on probabilities included in the probability distribution and for the sequence of tokens. In some implementations, the one or more animated physical motion gestures may include animated physical motion gestures that are specific to the virtual character. In additional or alternative implementations, the one or more animated physical motion gestures may include general animated physical motion gestures, but selection of the animated physical motion gestures for inclusion in the one or more visual cues may be biased towards one or more animated physical motion gestures that are specific to the virtual character.

In some implementations, the interactive chatbot can receive acoustic sensor data capturing a spoken utterance of the user, and process the acoustic sensor data using an automatic speech recognition (ASR) model to generate an ASR output which recognizes the spoken utterance in natural language. Such generated ASR output can be processed, using a natural language understanding (NLU) model, to generate a NLU output, based on which an interactive chatbot output that is responsive to the spoken utterance can be generated and rendered (audibly and/or visually) to the user. Optionally, the interactive chatbot output can be applied to control a facial expression, an appearance, a background, a voice, a movement, and/or a gesture, of the virtual character (or other visual or audible aspects of the interactive chatbot). Optionally, before being rendered to the user, the interactive chatbot output can be modified based on a type of the interactive chatbot (or virtual character) and/or services (or functions) provided by the interactive chatbot, where the modified interactive chatbot output is rendered to the user as a response to the spoken utterance.

Alternatively or additionally, in some implementations, the acoustic sensor data capturing a spoken utterance, along with the ASR output, the NLU output, a context of a dialog session ("interactive conversation"), and/or other text (e.g., a description of a virtual character selected by the user to visually represent the interactive chatbot, or a description of a service or function of the interactive chatbot, etc.), can be processed using the LLM, to generate the interactive chatbot output. In some of these implementations, the generated interactive chatbot output may not need to be modified since it may be generated specific to the virtual character through utilization of the LLM. For instance, an instance of the LLM may have been previously trained to generate interactive chatbot outputs for a given virtual character. In this instance, each of the plurality of virtual characters may be associated with a corresponding instance of the LLM. Also, for instance, the LLM may be general to the plurality of virtual characters selectable to visually represent the interactive chatbot, but the LLM may additionally process given virtual character data that is specific to the given virtual character to tailor the interactive chatbot output, generated using the LLM.

By using the techniques described herein, one or more technical advantages can be achieved. As one non-limiting example, the techniques described herein enable the interactive chatbot to not only provide more robust and contextually relevant content to initiate or continue a dialog session with the user, but also control a display and/or a voice of the virtual character that visually represents the interactive chatbot. As a result, dialog sessions between the user and the interactive chatbot may better resonate with the user through utilization of the LLMs described herein. As a result, a quantity of instances that the user repeats a spoken utterance and/or a quantity of instances that the dialog sessions fails may be reduced, thereby reducing a quantity of computational and/or network resources consumed in the user repeating the spoken utterance and/or the dialog session failing.

Figure 2A:
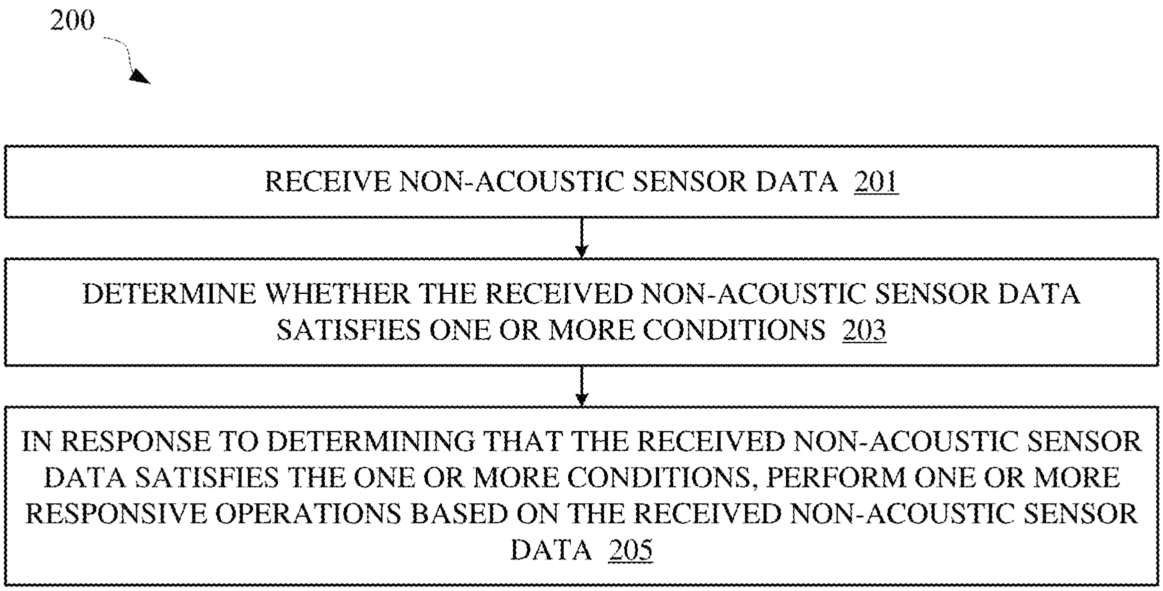
FIG. 2A is a flowchart illustrating an example method of performing responsive operations in response to non-acoustic sensor data, in accordance with various implementations.

FIG. 2A is a flowchart illustrating an example method 200 of performing responsive operations in response to non-acoustic sensor data, in accordance with various implementations. For convenience, the operations of the method 200 are described with reference to a system that performs the operations. This system of the method 200 includes one or more processors, memory, and/or other components of a computing device (e.g., client device 11 of FIG. 1A). Moreover, while operations of the method 200 are shown in a particular order, this is not meant to be limiting. One or more operations may be reordered, omitted, and/or added.

At block 201, the system receives non-acoustic sensor data from a non-acoustic sensor of a client device. Here, the client device can be, for instance, a computer, a robot, a smart device, a vehicle, or any other applicable device. The non-acoustic sensor can be, or can include, a touch sensor, a vision sensor, an accelerometer, an orientation sensor, a pressure sensor, a bump sensor, an ambient light sensor, a temperature sensor, a compass sensor, a clock, a location sensor, a barometer, a humidity sensor, a pedometer, a proximity sensor, a wheel encoder, or any other applicable non-acoustic sensor. As a non-limiting example, the non-acoustic sensor data, for instance, can be accelerometer data, detected by an accelerometer of the client device, that indicates the client device is moving at a particular speed.

At block 203, the system determines whether the received non-acoustic sensor data satisfies one or more conditions. At block 205, in response to determining that the received non-acoustic sensor data satisfies the one or more conditions, the system performs one or more responsive operations based on the received sensor data. Here, the one or more conditions that trigger performance of the one or more responsive operations can be, or can include a condition, based on a particular type of the non-acoustic sensor data, and/or content of the non-acoustic sensor data. Alternatively or additionally, the one or more conditions can be based on a category of an interactive chatbot installed at the client device and/or service(s) provided by the interactive chatbot. Alternatively or additionally, the one or more conditions can be based on a virtual character selected by a user of the interactive chatbot to visually represent the interactive chatbot. Alternatively or additionally, the one or more conditions can be based on non-acoustic user input.

For example, the one or more conditions can include a condition which is satisfied when the non-acoustic sensor data is received from one or more particular sensors, or one or more particular types of sensors. In this example, optionally, the one or more particular sensors can be specific to a virtual character selected by the user, or can be specific to the interactive chatbot. In other words, the system may perform one or more responsive operations for non-acoustic sensor data received from certain sensor(s) when a first virtual character is displayed to the user, and may perform the one or more responsive operation for non-acoustic sensor data received from certain other sensor(s) when a second virtual character is displayed to the user.

Alternatively or additionally, in some implementations, the one or more conditions can include a condition which is satisfied when a numerical value, in the received sensor data detected by the non-acoustic sensor, satisfies a threshold value. As a non-limiting example, a thermal sensor can detect a room temperature of 8 degree C., which is lower than a threshold temperature of 10 degree C., indicating that a cold weather condition, of the one or more conditions, is satisfied. In this example, only thermal data indicating a temperature lower than or equal to 10 degree C. is considered to satisfy the cold weather condition, thereby triggering the performance of the one or more responsive operations on such thermal data. Optionally, the aforementioned threshold value can also be specific to a virtual character selected by the user, or can be specific to the interactive chatbot.

Alternatively or additionally, the one or more conditions can include a condition which is satisfied when the received non-acoustic sensor data indicates that the client device is in one of a plurality of particular states (may also be referred to as "client device states", which can include a state of "moving at a fast speed"). In this example, optionally, the particular state of the client device can also be specific to a virtual character selected by the user, or can be specific to the interactive chatbot.

Alternatively or additionally, the one or more conditions can include a condition which is satisfied when the received non-acoustic sensor data indicates that an environment of the client device is in one of a plurality of particular state (may also be referred to as "environment states", which can include a state of "dark", "cold", etc.). Alternatively or additionally, the one or more conditions can include a condition which is satisfied when the non-acoustic sensor data includes non-acoustic user input, such as a user gesture. It's appreciated that one or more conditions can include other applicable conditions.

Once the received sensor data is determined to satisfy the one or more conditions, the system can perform one or more responsive operations on the received sensor data. As a non-limiting example, the one or more responsive operations can be, or include, pre-processing the received non-acoustic sensor data to generate a natural language description for the non-acoustic sensor data. The received non-acoustic sensor data can be, for instance, accelerometer data read as "x=0.01 g, y=−9.0 g, z=0.04 g". Correspondingly, the natural language description generated by pre-processing the accelerometer data can be, for instance, "the accelerometer indicates that the client device is falling", "the accelerometer of the client device detects a free-falling state", etc.

Alternatively or additionally, the one or more responsive operations can be, or include, processing the received non-acoustic sensor data using a trained large language model (LLM), where the received non-acoustic sensor data is processed as input to the trained LLM, for the trained LLM to generate an LLM output. Alternatively or additionally, the one or more responsive operations can be, or include, processing the natural language description that is generated by pre-processing the received non-acoustic sensor data, using a trained large language model (LLM), where the trained LLM is utilized to process such generated natural language description as input, to generate an LLM output. Alternatively or additionally, the one or more responsive operations can be, or include, processing the received non-acoustic sensor data and the natural language description that is generated by pre-processing the received non-acoustic sensor data, using a trained large language model (LLM), where the trained LLM is utilized to process the received non-acoustic sensor data and such generated natural language description, as input, to generate an LLM output.

Alternatively or additionally, a trained LLM can be utilized to process the received non-acoustic sensor data (and/or a correspondingly generated natural language description), along with other data (e.g., audio data not capturing user utterance, audio data capturing user utterance, a natural language description of the audio data not capturing any user utterance, a speech recognition of a user utterance, a description of a virtual character or interactive chatbot, a chat history, a description of user preference, etc.), as input, to generate a corresponding LLM output.

In some implementations, the one or more responsive operations can further include, generating, based on the LLM output, a natural language statement that is responsive to the received non-acoustic sensor data. For instance, the LLM output can be a text, i.e., "Exciting! Where are we going?", generated based on an input (a natural language description describing that the client device is in a vehicle that moves at a speed of 25 mph). In this case, a natural language statement can be generated to be the same as the LLM output ("Exciting! Where are we going?"), or the natural language statement can be generated by modifying the LLM output, to read "This is exciting! Where are we going?", "Ooh, exciting! Where are we going?", etc.

Alternatively or additionally, in some implementations, the one or more responsive operations can include, controlling a virtual character that visually represents the interactive chatbot based on the LLM output. In these implementations, a facial expression, an appearance, a background, a voice, a movement, and/or a gesture, of the virtual character (or other aspects of the interactive chatbot, such as a background of the interactive chatbot), can be controlled responsive to the received non-acoustic sensor data. For instance, given the LLM output, i.e., "Exciting! Where are we going?", a voice of the virtual character can be controlled by modifying (e.g., raising) a volume of the voice and/or modifying a tone of the voice (e.g., configure the voice to sound excited). As another instance, a facial expression of the virtual character can be configured to show excitement.

In some implementations, the one or more responsive operations can further include, causing the generated natural language statement to be visually and/or audibly rendered to a user of the client device.

Figure 2B:
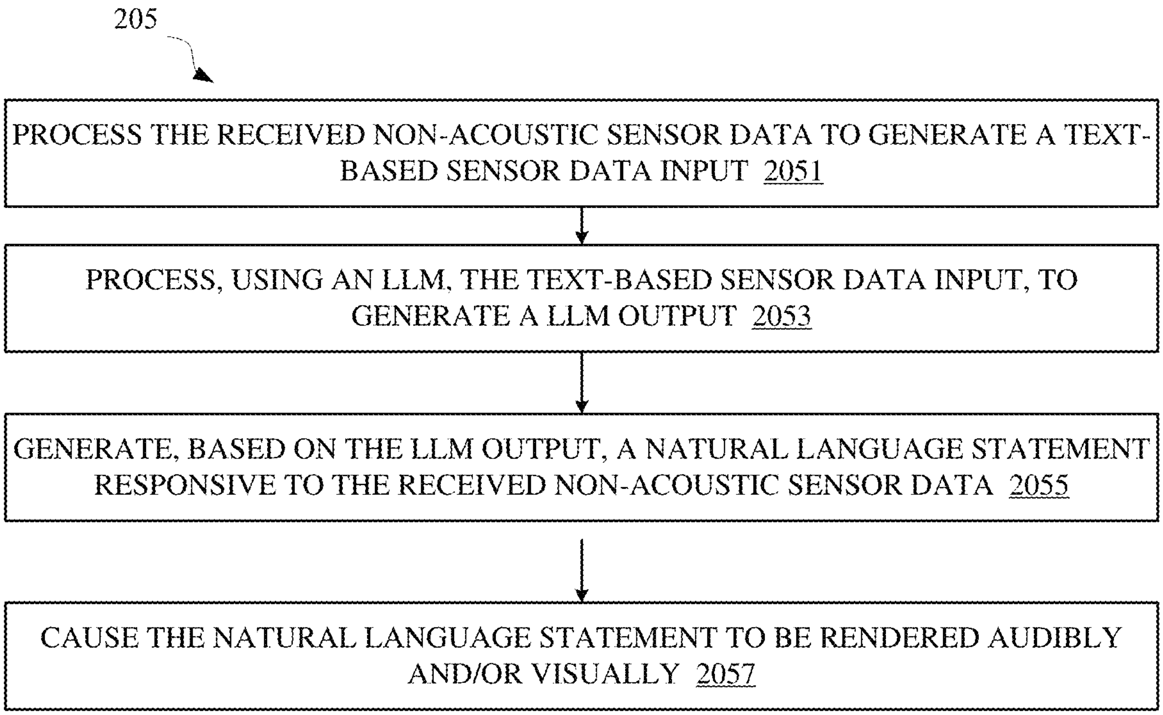
FIG. 2B is a flowchart illustrating an example of performing one or more responsive operations in FIG. 2A.

FIG. 2B is a flowchart illustrating an example of performing one or more responsive actions/operations in FIG. 2A. As shown in FIG. 2B, as a non-limiting example, the one or more responsive operations in FIG. 2A can include: processing the received non-acoustic sensor data to generate a text-based sensor data input (2051); and processing, using a large language model (LLM), the text-based sensor data input, to generate an LLM output (2053); generating, based on the LLM output, a natural language statement responsive to the received non-acoustic sensor data (2055), and causing the natural language statement to be audibly and/or visually rendered via the client device (2057).

Figure 3:
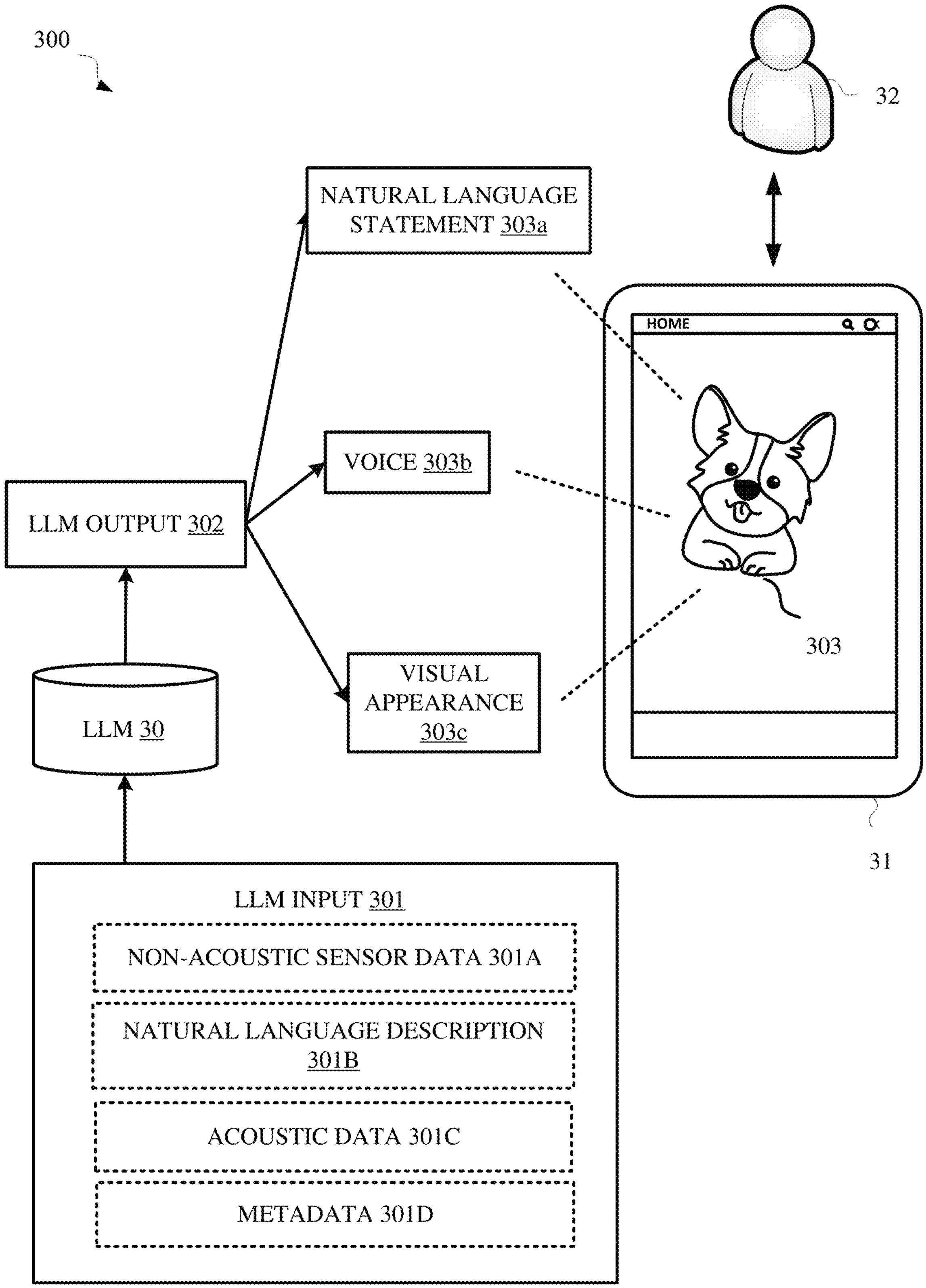
FIG. 3 illustrates usages of an LLM output, in accordance with various implementations.

FIG. 3 illustrates usages of the LLM output (e.g., depicted in FIG. 2B or other aspects of this disclosure), in accordance with various implementations. As shown in FIG. 3, an LLM output 302 can be generated by using an LLM 30 to process an LLM input 301 that is generated based on any of the aforementioned non-acoustic sensor data 301A, where the input to the LLM 30 can include the non-acoustic sensor data 301A, a natural language description 301B for the non-acoustic sensor data 301A, acoustic data 301C capturing or not capturing voice input from a user, and/or metadata 301D (e.g., chat history, user preference, user historical data, a description of a client device/interactive chatbot/virtual character, etc.). The LLM output 302 can be applied to generate a natural language statement 303*a* that is responsive to the non-acoustic sensor data 301A, where the natural language statement 303*a* can be rendered audibly and/or visually to a user 32 via a client device 31 that captures the non-acoustic sensor data 301A using one or more non-acoustic sensors (not shown) installed at the client device 31. The natural language statement 303*a* can be (but not necessarily need to) rendered as a statement provided by a virtual character 303 that visually represents an interactive chatbot (not shown) installed at, or accessible, via the client device 31.

Optionally or additionally, the LLM output 302 can be applied to, in response to the non-acoustic sensor data 301A, tune a voice 303*b* of the virtual character 303 that visually represents the interactive chatbot installed at, or accessible via the client device 31. In this case, the natural language statement 303*a* can be audibly rendered via an audible interface of the client device 31 by: causing the natural language statement 303*a* to be audibly rendered, in the tuned voice 303*b* of the virtual character 303, via the audible interface of the client device 31.

Alternatively or additionally, the LLM output 302 can be used to modify a visual appearance 303*c* of the virtual character 303 displayed at a graphical interface of the interactive chatbot, in response to the non-acoustic sensor data 301A. Here, the visual appearance 303*c* of the virtual character based on the LLM output, a facial expression, a gesture, a movement, and/or other visual aspects (color, outfit, hair style, animation, etc.) of the virtual character. Alternatively or additionally, the LLM output 302 can be used to modify other aspects of a graphical interface (see FIG. 7 as an example) of the interactive chatbot, such as a background of the graphical interface of the interactive chatbot.

Figure 4:
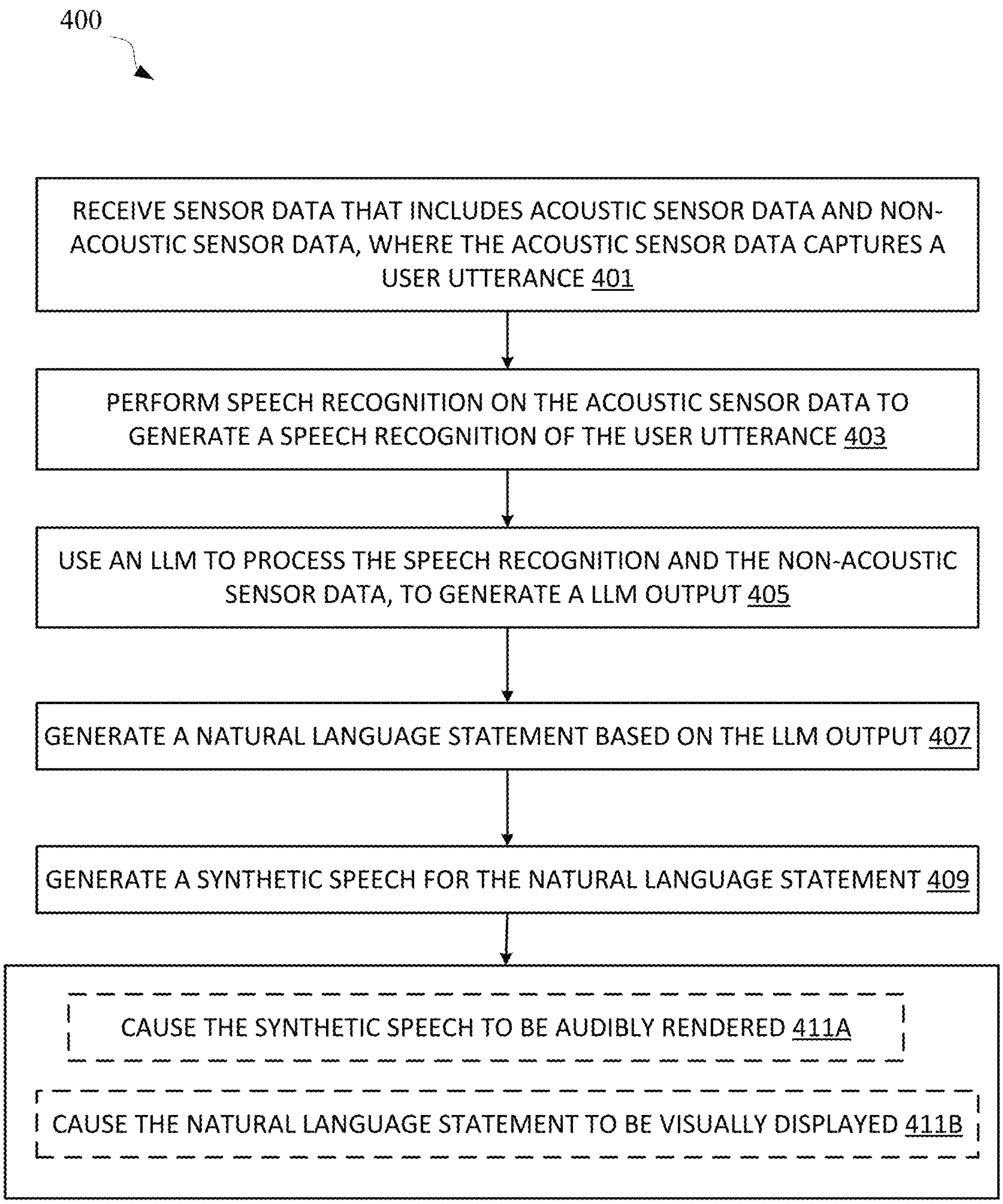
FIG. 4 is a flowchart illustrating another example method of processing non-acoustic sensor data using an LLM, in accordance with various implementations.

FIG. 4 is a flowchart illustrating an example method 400 of processing non-acoustic sensor data using an LLM, in accordance with various implementations. For convenience, the operations of the method 400 are described with reference to a system that performs the operations. This system of the method 400 includes one or more processors, memory, and/or other components of a computing device (e.g., client device 11 of FIG. 1). Moreover, while operations of the method 400 are shown in a particular order, this is not meant to be limiting. One or more operations may be reordered, omitted, and/or added.

At block 401, the system receives sensor data from one or more sensors of a client device, where the sensor data includes acoustic sensor data that captures a user utterance and non-acoustic sensor data that indicates a client device state or an environment state of the client device. Optionally, in some implementations, the acoustic sensor data that captures the user utterance needs to be captured by the client device within a predetermined period of time since (or before) the non-acoustic sensor data has been captured. Optionally, the non-acoustic sensor data here needs to satisfy the one or more conditions described.

At block 403, in response to receiving the sensor data from the one or more sensors of the client device, the system can perform speech recognition on the acoustic sensor data that captures the user utterance, to generate a speech recognition of the user utterance. Optionally, the non-acoustic sensor data can be processed, at block 403, into a natural language description that describes the non-acoustic sensor data. Here, the natural language description can describe the non-acoustic sensor data in its original form, or can describe the client device state (and/or the environment state) of the client device indicated by the non-acoustic sensor data.

At block 405, the system can use an LLM to process the speech recognition of the user utterance and the non-acoustic sensor data (and additionally, metadata such as a description of user preference/habit) as input, to generate an LLM output. Alternatively, the LLM to process the speech recognition of the user utterance and the natural language description that describes the non-acoustic sensor data as input, to generate a corresponding LLM output.

At block 407, the system can generate, based on the generated LLM output, a natural language statement responsive to the received sensor data. At block 409, the system can generate a synthetic speech for the generated natural language statement, to audibly present the generated natural language statement. Here, a voice in which the synthetic speech is audibly present can be controlled based on the generated LLM output. For instance, the LLM output can be generated based on (1) user utterance ("What to do now?") and (2) non-acoustic sensor data indicate that a room in which a user stays is bright and warm (and/or (3) historical data indicating the user is a frequent visitor of cinemas), and be applied to generate a natural language statement, i.e., "looks like you are having a cozy day, any plans to watch a movie?". In this instance, a synthetic speech (e.g., "looks like you are having a cozy day, any plans to watch a movie?") can be generated by performing text-to-speech on the generated natural language statement, and a voice to deliver such synthetic speech can be controlled based on the LLM output to be delightful and have a moderate voice volume.

Optionally, at block 411A, the system can cause the synthetic speech to be audibly rendered via the client device. Optionally, at block 411B, the system can cause the natural language statement to be visually rendered via the client device, and/or control the synthetic speech to be audibly rendered via the client device, based on the LLM output, a visual appearance of a virtual character that is displayed at the client device as a source that provides the synthetic speech.

Figure 5:
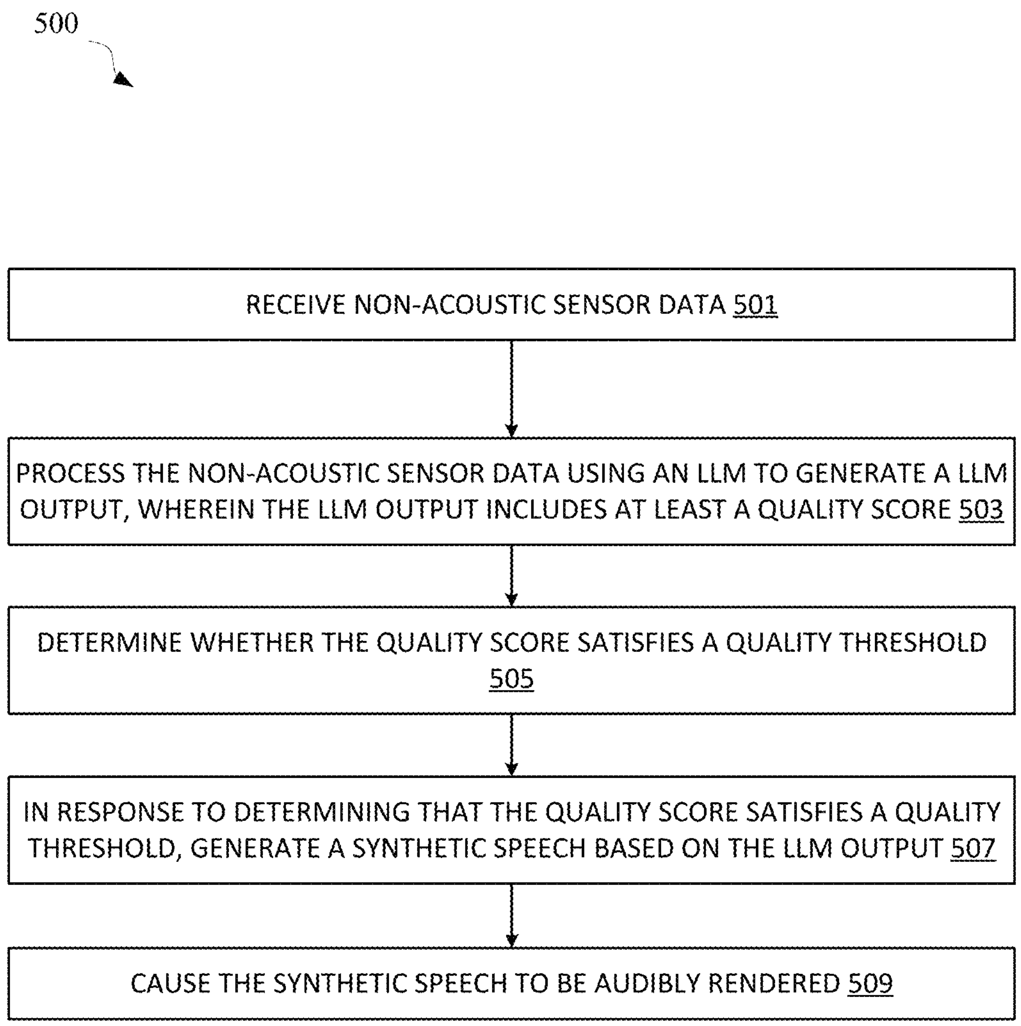
FIG. 5 is a flowchart illustrating another example method of processing non-acoustic sensor data using an LLM, in accordance with various implementations.

FIG. 5 is a flowchart illustrating an example method 500 of processing non-acoustic sensor data using an LLM, in accordance with various implementations. For convenience, the operations of the method 500 are described with reference to a system (e.g., an interactive chatbot) that performs the operations. This system of the method 500 includes one or more processors, memory, and/or other components. Moreover, while operations of the method 500 are shown in a particular order, this is not meant to be limiting. One or more operations may be reordered, omitted, and/or added.

At block 501, the system receives non-acoustic sensor data from a non-acoustic sensor of a client device. Optionally, the non-acoustic sensor data here may need to satisfy the aforementioned one or more conditions.

At block 503, the system processes the non-acoustic sensor data using an LLM as input, to generate an LLM output, where the LLM output can include textual content responsive to the non-acoustic sensor data, and a quality score indicating a quality of the textual content responsive to the non-acoustic sensor data. Optionally or additionally, the LLM output here (or described in other portions of this disclosure) can include one or more visual cues for controlling one or more visual aspects (e.g., gesture, appearance, motions, etc.) of a virtual character for an interactive chatbot that is to visually or audibly render the textual content (or natural language statement generated based on the textual content) responsive to the non-acoustic sensor data. Optionally or additionally, the one or more visual clues can also control other aspects of the interactive chatbot, such as a background color/picture of a graphical interface of the interactive chatbot At block 505, the system determines whether the quality score satisfies a qualify threshold. At block 507, in response to determining that the quality score satisfies the qualify threshold, the system, based on the LLM output, generates a synthetic speech and/or determines a voice or a visual appearance of a virtual character that represents an interactive chatbot that is to audibly render the synthetic speech. At block 509, the system audibly renders the synthetic speech in the determined voice, and/or controls the virtual character to have the determined visual appearance.

Figure 6:
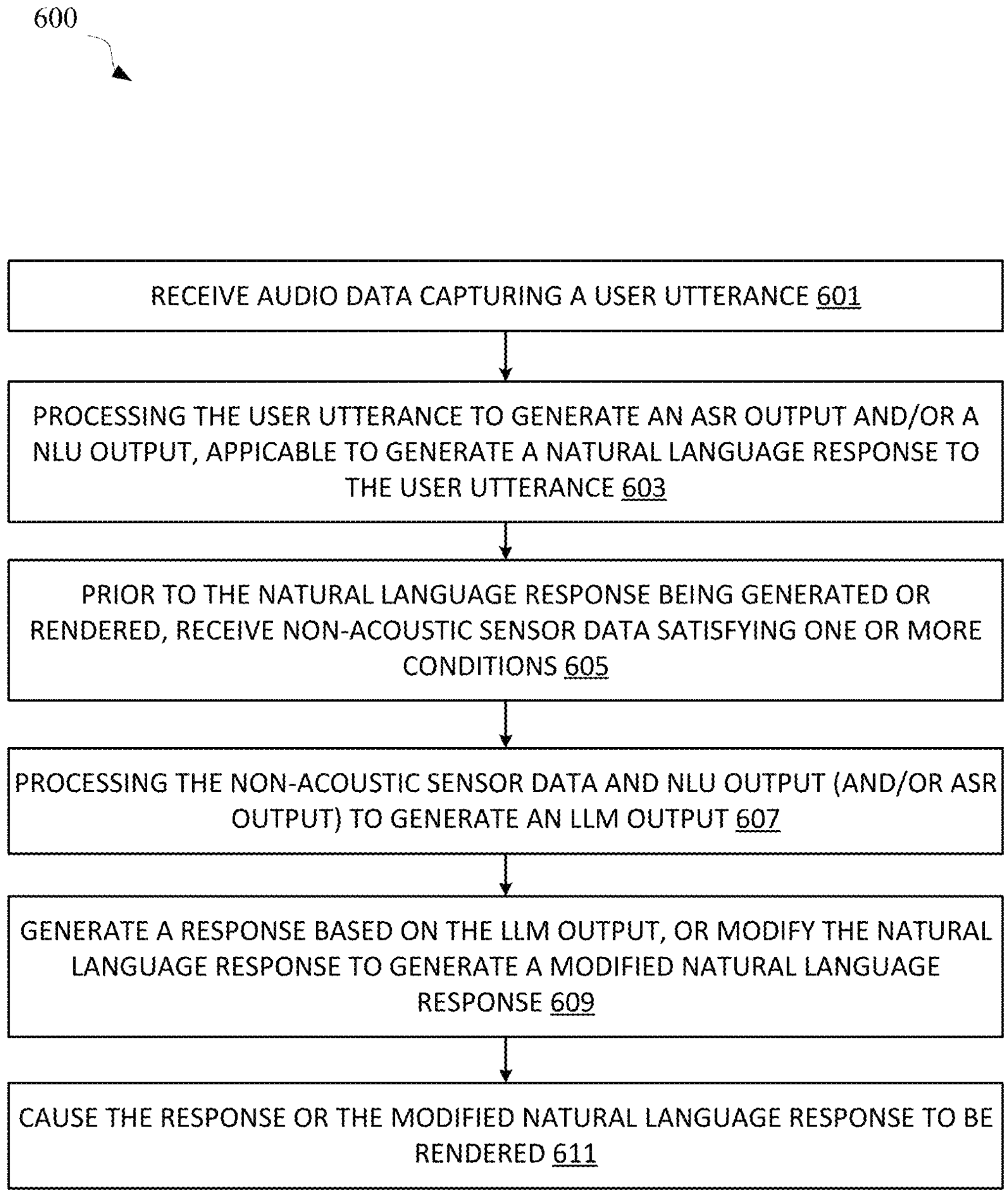
FIG. 6 is a flowchart illustrating another example method of processing non-acoustic sensor data using an LLM, in accordance with various implementations.

FIG. 6 is a flowchart illustrating an example method 600 of processing non-acoustic sensor data using an LLM, in accordance with various implementations. For convenience, the operations of the method 600 are described with reference to a system that performs the operations. This system of the method 600 includes one or more processors, memory, and/or other components of a computing device (e.g., client device 11 of FIG. 1). Moreover, while operations of the method 600 are shown in a particular order, this is not meant to be limiting. One or more operations may be reordered, omitted, and/or added.

At block 601, the system can receive audio data capturing a user utterance of a user. At block 603, the system can process the user utterance to generate a ASR output and/or a NLU output, based on which a natural language response to the user utterance is to be generated. At block 605, the system can, prior to generating or rendering the natural language response (audibly or visually), detect/receive non-acoustic sensor data that satisfied one or more conditions that trigger processing of the non-acoustic sensor data using an LLM. Here, the one or more conditions can include any of the aforementioned one or more conditions, in addition to a temporal condition requiring the non-acoustic sensor data to be captured within a predefined period of time since the user utterance is captured.

At block 607, the system can process the non-acoustic sensor data and the NLU output (or ASR output) using the LLM as input, to generate an LLM output. Descriptions of the non-acoustic sensor data and the corresponding LLM output can be found elsewhere in this disclosure, and repeated descriptions are omitted herein.

At block 609, the system can generate a response to the user utterance based on the LLM output. Alternatively, the system can modify the natural language response (if already generated) based on the LLM output, to generate a modified natural language response.

At block 611, the system can render the response or the modified natural language response to the user. Here, optionally, the response or the modified natural language response can be rendered to the user in a particular voice, where the particular voice is selected or generated based on the LLM output. Alternatively or additionally, the response or the modified natural language response can be rendered to the user visually as a statement from a virtual character. In this case, a visual appearance of the virtual character can be controlled based on the LLM output.

Figure 7:
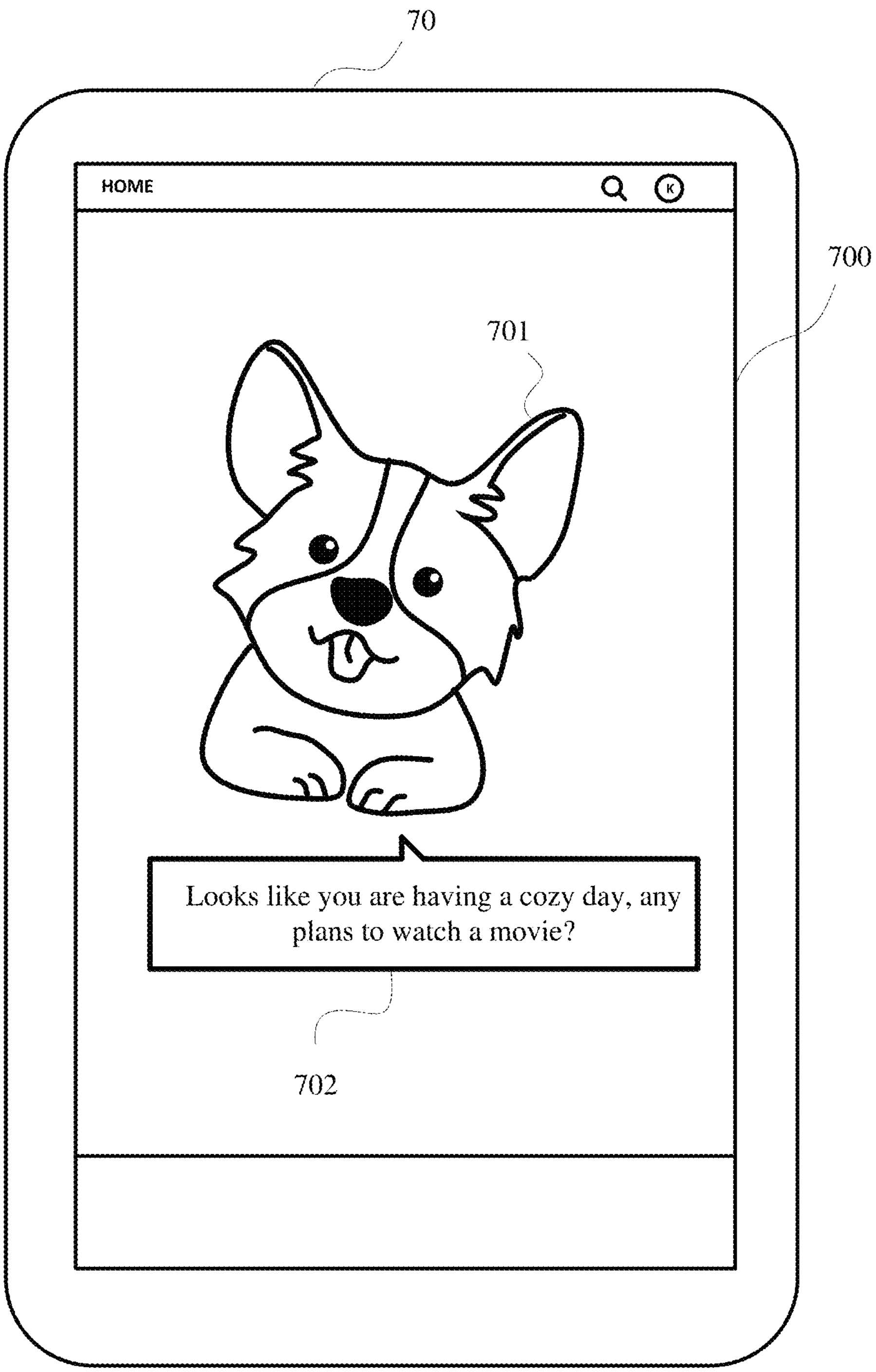
FIG. 7 illustrates an example graphical interface of an interactive chatbot showing a virtual character, in accordance with various implementations.

FIG. 7 illustrates an example graphical interface of an interactive chatbot, in accordance with various implementations. As shown in FIG. 7, a graphical interface 700 of a client device 70 at which an interactive chatbot is installed can display a virtual character 701 that visually represents the interactive chatbot. The virtual character 701 can interact with a user of the client device 70 by initialing a human-to-computer dialog through a statement 702, such as "Looks like you are having a cozy day, any plans to watch a movie?", where the statement 702 can be generated in response to receiving non-acoustic sensor data as described above. While being displayed as a corgi in FIG. 7, the virtual character 701 can be an animated avatar based on other objects, such as a real human, a fictional character, a different animal, an animated object, and/or other visualized representations. In some implementations, the virtual character 701 can be selected by a user of the interactive chatbot, from a plurality of virtual characters provided by the interactive chatbot. The plurality of virtual characters can be different avatars and each has a corresponding artificial personality, meaning they will respond to the same user input (and/or other sensor data) in a different manner. A visual appearance and/or a voice of the virtual character 701 can be controlled in response to receiving certain sensor data, be it voice input from a user or non-acoustic sensor data that indicates a client device state or an environment state of a client device at which the interactive chatbot is installed. Here, the visual appearance can include a facial expression, a gesture, a background, a movement, a color, an attire, and/or any other applicable facial expression. Further, the voice of the virtual character 701 can be controlled to have a different tone or volume.

Figure 8:
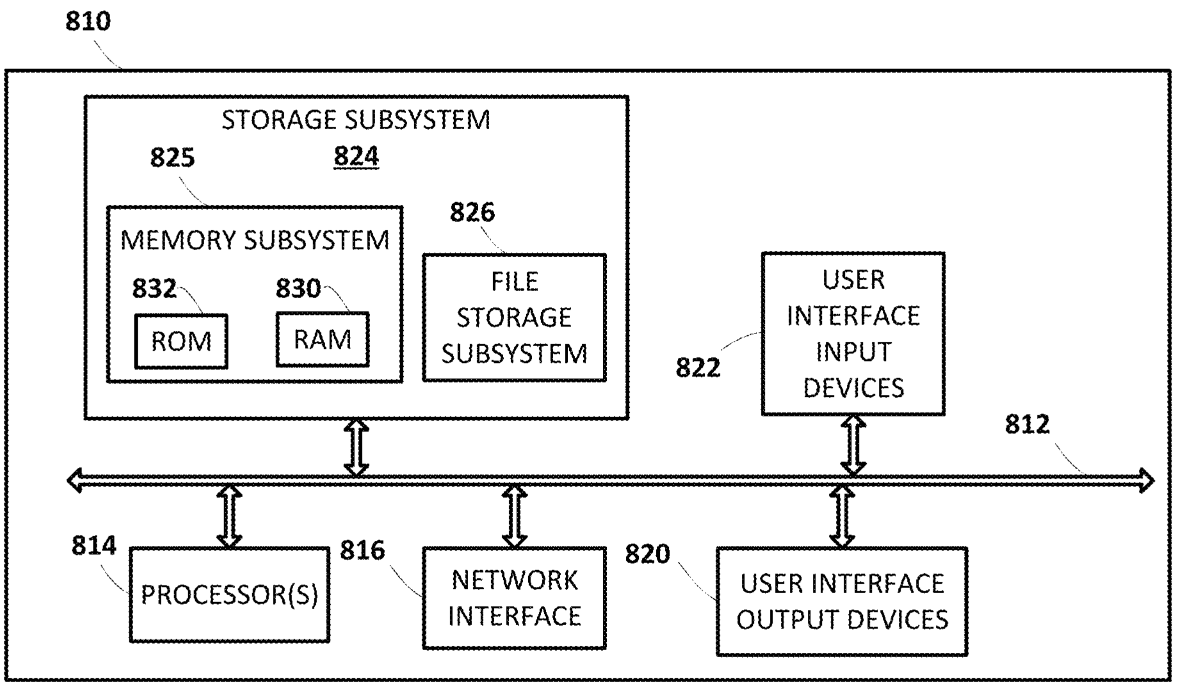
FIG. 8 illustrates an example architecture of a computing device.

Turning now to FIG. 8, a block diagram of an example computing device 810 that may optionally be utilized to perform one or more aspects of techniques described herein is depicted. In some implementations, one or more of a client device, cloud-based interactive chatbot component(s), and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem 812 may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is provided, and includes: receiving non-acoustic sensor data from a non-acoustic sensor of a client device, and determining whether the received non-acoustic sensor data satisfies one or more conditions. In some implementations, the method further include, in response to determining that the received non-acoustic sensor data satisfies the one or more conditions: processing the received non-acoustic sensor data to generate a natural language description for the non-acoustic sensor data; processing, using a large language model (LLM), the generated natural language description for the non-acoustic sensor data, as input, to generate an LLM output; generating, based on the LLM output, a natural language statement that is responsive to the received non-acoustic sensor data; and causing the natural language statement to be rendered at the client device via an interactive chatbot that is installed at the client device or that is otherwise accessible via the client device.

In some implementations, optionally, the method can further include: tuning, based on the LLM output, a voice of a virtual character that visually represents the interactive chatbot. In these implementations, causing the natural language statement to be rendered at the client device via the chatbot can include: causing the natural language statement to be audibly rendered, in the tuned voice of the virtual character, via an audible interface of the client device.

In some implementations, optionally, the method can further include: modifying, based on the LLM output, a visual appearance of a graphical interface of the interactive chatbot. Modifying the visual appearance of the graphical interface of the interactive chatbot can include: modifying a character visual appearance of a virtual character displayed at the graphical interface of the interactive chatbot; and/or modifying a background of the graphical interface of the interactive chatbot. Optionally, modifying the visual appearance of the graphical interface of the interactive chatbot can include: modifying the character visual appearance of the virtual character. Optionally, modifying the character visual appearance of the virtual character can include: controlling, based on the LLM output, a facial expression, a gesture, and/or a movement of the virtual character.

In some implementations, the one or more conditions are specific to a current configuration, for one or more adjustable settings, of the interactive chatbot and for the client device. For instance, the one or more conditions can be specific to a type, service, or function of the one or more adjustable settings of the interactive chatbot.

In some implementations, processing the received non-acoustic sensor data to generate the natural language description responsive to the non-acoustic sensor data can include: determining, based on the received non-acoustic sensor data, a client device state of the client device or an environment state of an environment of the client device; and generating the natural language description to reflect the client device state or the environment state of the client device.

In some implementations, determining whether the non-acoustic received sensor data satisfies the one or more conditions can include: determining whether a numerical value, in the received non-acoustic sensor data detected by the non-acoustic sensor, satisfies a threshold value; determining that the received non-acoustic sensor data satisfies the one or more conditions based on determining that the numerical value satisfies the threshold value; and determining that the received non-acoustic sensor data does not satisfy the one or more conditions based on determining that the numerical value does not satisfy the threshold value.

In some implementations, determining whether the non-acoustic received sensor data satisfies the one or more conditions can include: determining, based on a particular virtual character being a currently active virtual character for the interactive chatbot, whether the received non-acoustic sensor data is of a type for which the particular virtual character is responsive; determining that the received non-acoustic sensor data satisfies the one or more conditions based on determining that the received non-acoustic sensor data is of the type for which the particular virtual character is responsive; and determining that the received non-acoustic sensor data fails to satisfy the one or more conditions based on determining that the received non-acoustic sensor data is not of the type for which the particular virtual character is responsive.

In some implementations, determining whether the received non-acoustic sensor data satisfies one or more conditions can include: determining, based on a particular virtual character being a currently active virtual character for the interactive chatbot, whether the received non-acoustic sensor data includes content for which the particular virtual character is responsive; determining that the received non-acoustic sensor data satisfies the one or more conditions based on determining that the received non-acoustic sensor data includes content for which the particular virtual character is responsive; and determining that the received non-acoustic sensor data fails to satisfy the one or more conditions based on determining that the received non-acoustic sensor data does not include content for which the particular virtual character is responsive.

In some implementations, the method further includes, in response to determining that the received non-acoustic sensor data does not satisfy the one or more conditions: bypassing processing of the received non-acoustic sensor data to generate the natural language description, and/or bypassing processing, using the LLM, the generated natural language description. In some implementations, the method further includes, in response to determining that the received non-acoustic sensor data does not satisfy the one or more conditions: discarding the received non-acoustic sensor data without performing any further processing of the received non-acoustic sensor data.

In some implementations, causing the natural language statement to be rendered at the client device via the interactive chatbot can include: causing the natural language statement to be visually rendered via a graphical interface of the interactive chatbot. In some implementations, the method further includes: receiving audio data from an acoustic sensor of the client device; performing speech recognition, based on the audio data, to generate recognized natural language content recognized from a spoken utterance captured by the audio data; and processing, using the LLM and along with the generated natural language description for the non-acoustic sensor data, the recognized natural language content to generate the LLM output. In these implementations, optionally, processing the generated natural language description for the non-acoustic sensor data along with the recognized content using the LLM is in response to the audio data and the non-acoustic sensor data being received in a same human-to-computer dialog and/or being received within a threshold period of time of one another. Optionally, processing the generated natural language description for the non-acoustic sensor data along with the recognized content using the LLM can include: priming the LLM by processing, using the LLM, the generated natural language description for the non-acoustic sensor data; and processing, using the LLM and after priming the LLM, the recognized natural language content to generate the LLM output.

In some implementations, the method further includes processing, using the LLM and along with the generated natural language description for the non-acoustic sensor data, context data for an ongoing human-to-computer dialog between a user of the client device and the interactive chatbot. In some versions of those implementations, the context data includes a current utterance from the user in the ongoing human-to-computer dialog, a prior utterance from the user in the ongoing human-to-computer dialog, a current response from the interactive chatbot in the ongoing human-to-computer dialog, and/or a prior response from the interactive chatbot in the ongoing human-to-computer dialog. In some additional or alternative versions of those implementations, the context data includes non-sensor based context data such as a current date, a current time, and/or a current day of the week.

In some implementations, another method implemented by one or more processors is provided, and includes: receiving non-acoustic sensor data to which an interactive chatbot is responsive, wherein the interactive chatbot is installed at or accessible via a client device; processing the received non-acoustic sensor data to generate a natural language description for the non-acoustic sensor data; processing, using a large language model (LLM), the generated natural language description for the non-acoustic sensor data to generate an LLM output; generating, based on the LLM output, a natural language statement that is responsive to the received non-acoustic sensor data; tuning, based on the LLM output, a voice of the interactive chatbot; and causing the natural language statement to be audibly rendered in the tuned voice of the interactive chatbot.

In some implementations, a further method implemented by one or more processors is provided, and includes: receiving audio data from one or more acoustic sensors of a client device; receiving non-acoustic audio data from one or more non-acoustic sensors of the client device; processing, using a large language model (LLM), input generated based on both the audio data and the non-acoustic audio data, to generate an LLM output; generating, based on the LLM output, chatbot output for an interactive chatbot; and causing the chatbot output to be rendered by the interactive chatbot and at the client device.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method for generating a natural language statement responsive to non-acoustic sensor data, the method implemented by one or more processors, and the method comprising:

receiving non-acoustic sensor data from a non-acoustic sensor of a client device;

determining whether the received non-acoustic sensor data satisfies one or more conditions; and in response to determining that the received non-acoustic sensor data satisfies the one or more conditions:

processing the received non-acoustic sensor data to generate a natural language description for the non-acoustic sensor data, processing, using a large language model (LLM), the generated natural language description for the non-acoustic sensor data, as input, to generate an LLM output, generating, based on the LLM output, a natural language statement that is responsive to the received non-acoustic sensor data, and causing the natural language statement to be rendered at the client device via an interactive chatbot that is installed at the client device or that is otherwise accessible via the client device.

2. The method of claim 1, further comprising:

tuning, based on the LLM output, a voice of a virtual character that visually represents the interactive chatbot.

3. The method of claim 2, wherein causing the natural language statement to be rendered at the client device via the chatbot comprises:

causing the natural language statement to be audibly rendered, in the tuned voice of the virtual character, via an audible interface of the client device.

4. The method of claim 1, further comprising:

modifying, based on the LLM output, a visual appearance of a graphical interface of the interactive chatbot, wherein modifying the visual appearance of the graphical interface of the interactive chatbot comprises:

modifying a character visual appearance of a virtual character displayed at the graphical interface of the interactive chatbot; and/or modifying a background of the graphical interface of the interactive chatbot.

5. The method of claim 4, wherein modifying the visual appearance of the graphical interface of the interactive chatbot comprises modifying the character visual appearance of the virtual character, and wherein modifying the character visual appearance of the virtual character comprises:

controlling, based on the LLM output, a facial expression, a gesture, and/or a movement of the virtual character.

6. The method of claim 1, wherein processing the received non-acoustic sensor data to generate the natural language description responsive to the non-acoustic sensor data comprises:

determining, based on the received non-acoustic sensor data, a client device state of the client device or an environment state of an environment of the client device, and generating the natural language description to reflect the client device state or the environment state of the client device.

7. The method of claim 1, wherein determining whether the received non-acoustic sensor data satisfies the one or more conditions comprises:

determining whether a numerical value, in the received non-acoustic sensor data detected by the non-acoustic sensor, satisfies a threshold value;

determining that the received non-acoustic sensor data satisfies the one or more conditions based on determining that the numerical value satisfies the threshold value; and determining that the received non-acoustic sensor data does not satisfy the one or more conditions based on determining that the numerical value does not satisfy the threshold value.

8. The method of claim 1, wherein determining whether the non-acoustic received sensor data satisfies the one or more conditions comprises:

determining, based on a particular virtual character being a currently active virtual character for the interactive chatbot, whether the received non-acoustic sensor data is of a type for which the particular virtual character is responsive;

determining that the received non-acoustic sensor data satisfies the one or more conditions based on determining that the received non-acoustic sensor data is of the type for which the particular virtual character is responsive; and determining that the received non-acoustic sensor data fails to satisfy the one or more conditions based on determining that the received non-acoustic sensor data is not of the type for which the particular virtual character is responsive.

9. The method of claim 1, wherein determining whether the received non-acoustic sensor data satisfies one or more conditions comprises:

determining, based on a particular virtual character being a currently active virtual character for the interactive chatbot, whether the received non-acoustic sensor data includes content for which the particular virtual character is responsive;

determining that the received non-acoustic sensor data satisfies the one or more conditions based on determining that the received non-acoustic sensor data includes content for which the particular virtual character is responsive; and determining that the received non-acoustic sensor data fails to satisfy the one or more conditions based on determining that the received non-acoustic sensor data does not include content for which the particular virtual character is responsive.

10. The method of claim 1, wherein the one or more conditions are specific to a current configuration, for one or more adjustable settings, of the interactive chatbot and for the client device.

11. The method of claim 10, wherein the one or more conditions are specific to a type, service, or function of the one or more adjustable settings of the interactive chatbot.

12. The method of claim 1, further comprising:

in response to determining that the received non-acoustic sensor data does not satisfy the one or more conditions:

bypassing processing of the received non-acoustic sensor data to generate the natural language description, and/or bypassing processing, using the LLM, of the generated natural language description.

13. The method of claim 12, further comprising:

in response to determining that the received non-acoustic sensor data does not satisfy the one or more conditions:

discarding the received non-acoustic sensor data without performing any further processing of the received non-acoustic sensor data.

14. The method of claim 1, wherein causing the natural language statement to be rendered at the client device via the interactive chatbot comprises:

causing the natural language statement to be visually rendered via a graphical interface of the interactive chatbot.

15. The method of claim 1, further comprising:

receiving audio data from an acoustic sensor of the client device;

performing speech recognition, based on the audio data, to generate recognized natural language content recognized from a spoken utterance captured by the audio data; and processing, using the LLM and along with the generated natural language description for the non-acoustic sensor data, the recognized natural language content to generate the LLM output.

16. The method of claim 15, wherein processing the generated natural language description for the non-acoustic sensor data along with the recognized natural language content using the LLM is in response to the audio data and the non-acoustic sensor data being received in a same human-to-computer dialog and/or being received within a threshold period of time of one another.

17. The method of claim 15, wherein processing the generated natural language description for the non-acoustic sensor data along with the recognized natural language content using the LLM comprises:

priming the LLM by processing, using the LLM, the generated natural language description for the non-acoustic sensor data; and processing, using the LLM and after priming the LLM, the recognized natural language content to generate the LLM output.

18. The method of claim 1, further comprising:

processing, using the LLM and along with the generated natural language description for the non-acoustic sensor data, context data for an ongoing human-to-computer dialog between a user of the client device and the interactive chatbot.

19. The method of claim 18, wherein the context data includes a current utterance from the user in the ongoing human-to-computer dialog, a prior utterance from the user in the ongoing human-to-computer dialog, a current response from the interactive chatbot in the ongoing human-to-computer dialog, and/or a prior response from the interactive chatbot in the ongoing human-to-computer dialog.

20. The method of claim 18, wherein the context data includes a current date, a current time, and/or a current day of the week.

21. One or more non-transitory computer-readable media comprising instructions that, when executed by one or more processors of one or more electronic devices, are to cause the one or more electronic devices to perform a method for generating a natural language statement responsive to non-acoustic sensor data, the method implemented by one or more processors, and the method comprising:

receiving non-acoustic sensor data from a non-acoustic sensor of a client device;

determining whether the received non-acoustic sensor data satisfies one or more conditions; and in response to determining that the received non-acoustic sensor data satisfies the one or more conditions:

processing the received non-acoustic sensor data to generate a natural language description for the non-acoustic sensor data, processing, using a large language model (LLM), the generated natural language description for the non-acoustic sensor data, as input, to generate an LLM output, generating, based on the LLM output, a natural language statement that is responsive to the received non-acoustic sensor data, and causing the natural language statement to be rendered at the client device via an interactive chatbot that is installed at the client device or that is otherwise accessible via the client device.

22. A system comprising:

one or more processors; and one or more non-transitory computer-readable media comprising instructions that, when executed by the one or more processors, are to cause one or more electronic devices to perform a method for generating a natural language statement responsive to non-acoustic sensor data, the method implemented by one or more processors, and the method comprising:

receiving non-acoustic sensor data from a non-acoustic sensor of a client device;

determining whether the received non-acoustic sensor data satisfies one or more conditions; and in response to determining that the received non-acoustic sensor data satisfies the one or more conditions:

processing the received non-acoustic sensor data to generate a natural language description for the non-acoustic sensor data, processing, using a large language model (LLM), the generated natural language description for the non-acoustic sensor data, as input, to generate an LLM output, generating, based on the LLM output, a natural language statement that is responsive to the received non-acoustic sensor data, and causing the natural language statement to be rendered at the client device via an interactive chatbot that is installed at the client device or that is otherwise accessible via the client device.

* * * * *